(12) United States Patent
Nakada

(10) Patent No.: US 11,843,488 B2
(45) Date of Patent: Dec. 12, 2023

(54) SIGNAL PROCESSING DEVICE, SIGNAL PROCESSING METHOD, AND RECEPTION DEVICE

(71) Applicant: SONY SEMICONDUCTOR SOLUTIONS CORPORATION, Kanagawa (JP)

(72) Inventor: Yutaka Nakada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 125 days.

(21) Appl. No.: 17/310,148

(22) PCT Filed: Jan. 14, 2020

(86) PCT No.: PCT/JP2020/000795
§ 371 (c)(1),
(2) Date: Jul. 21, 2021

(87) PCT Pub. No.: WO2020/158359
PCT Pub. Date: Aug. 6, 2020

(65) Prior Publication Data
US 2022/0070034 A1    Mar. 3, 2022

(30) Foreign Application Priority Data

Jan. 30, 2019    (JP) .................................. 2019-014435

(51) Int. Cl.
*H04L 27/14*    (2006.01)
*H04B 1/16*    (2006.01)

(52) U.S. Cl.
CPC ............... *H04L 27/14* (2013.01); *H04B 1/16* (2013.01)

(58) Field of Classification Search
CPC ...... H04H 20/426; H04H 60/00; H04H 60/07; H04N 21/6112; H04N 21/615;
(Continued)

(56) References Cited

U.S. PATENT DOCUMENTS

2006/0232447 A1* 10/2006 Walker .............. H04W 52/0245
341/50
2010/0262708 A1* 10/2010 Bouazizi ................ H04N 19/30
375/E7.02
(Continued)

FOREIGN PATENT DOCUMENTS

CN    107113448 A    8/2017
CN    109565348 A    4/2019
(Continued)

OTHER PUBLICATIONS

Xuelan Zou, Weiyan Liu, Xiaohua He, Xin Wang, An Adaptive Detection Scheme for Iteratively Decoded Bit-Interleaved Coded Modulation, 2008 China-Japan Joint Microwave Conference (Year: 2008).*

(Continued)

*Primary Examiner* — Aristocratis Fotakis
(74) *Attorney, Agent, or Firm* — CHIP LAW GROUP

(57) ABSTRACT

A signal processing device includes an acquisition unit that acquires identification information associated with data obtained by decoding a reception signal that includes a signal included in a first layer and a signal included in a different layer and superimposed on the signal of the first layer in a power axis direction, the data being output to a post-stage processing unit, a decoding unit that decodes the signal of the different layer on the basis of a result of decoding of the signal of the first layer after the decoding of the signal of the first layer, and an output control unit that outputs data obtained by decoding the signal of the different layer to the post-stage processing unit without outputting (Continued)

data obtained by decoding the signal of the first layer to the post-stage processing unit, in a case where data identified by the identification information is data obtained by decoding the signal of the different layer.

13 Claims, 20 Drawing Sheets

(58) Field of Classification Search
CPC ........... H04N 21/2365; H04N 21/4382; H04N 21/234327; H04N 21/2383; H04N 21/42615; H04N 21/4347; H04N 21/4345; H04L 27/14; H04L 27/26; H04B 1/16
See application file for complete search history.

(56) References Cited

U.S. PATENT DOCUMENTS

| | | | |
|---|---|---|---|
| 2016/0212458 A1* | 7/2016 | Kwon | ............ H04N 21/440227 |
| 2016/0218823 A1 | 7/2016 | Baek et al. | |
| 2016/0218909 A1 | 7/2016 | Baek et al. | |
| 2016/0344655 A1 | 11/2016 | Baek et al. | |
| 2017/0111198 A1* | 4/2017 | Park | ........................ H04L 27/38 |
| 2017/0272206 A1 | 9/2017 | Baek et al. | |
| 2019/0173502 A1 | 6/2019 | Kimura et al. | |
| 2019/0199460 A1* | 6/2019 | Simon | .................... H04H 20/18 |
| 2021/0344353 A1* | 11/2021 | Nakada | ................. H04L 1/0064 |

FOREIGN PATENT DOCUMENTS

| | | |
|---|---|---|
| EP | 3253062 A1 | 12/2017 |
| EP | 3253063 A1 | 12/2017 |
| EP | 3499754 A1 | 6/2019 |
| JP | 2004-015494 A | 1/2004 |
| JP | 2017-527167 A | 9/2017 |
| JP | 2018-504005 A | 2/2018 |
| KR | 10-2017-0072257 A | 6/2017 |
| WO | 2016/122060 A1 | 8/2016 |
| WO | 2016/122061 A1 | 8/2016 |
| WO | 2018/030204 A1 | 2/2018 |

OTHER PUBLICATIONS

ATSC Recommended Practice: Guidelines for the Physical Layer Protocol (A/327), Oct. 2, 2018 (Year: 2018).*
International Search Report and Written Opinion of PCT Application No. PCT/JP2020/000795, dated Apr. 7, 2020, 09 pages of ISRWO.
"ATSC Standard Physical Layer Protocol", ATSC Standard, Advanced Television Systems Committee, Jun. 6, 2017, 262 pages.

* cited by examiner

FIG.11
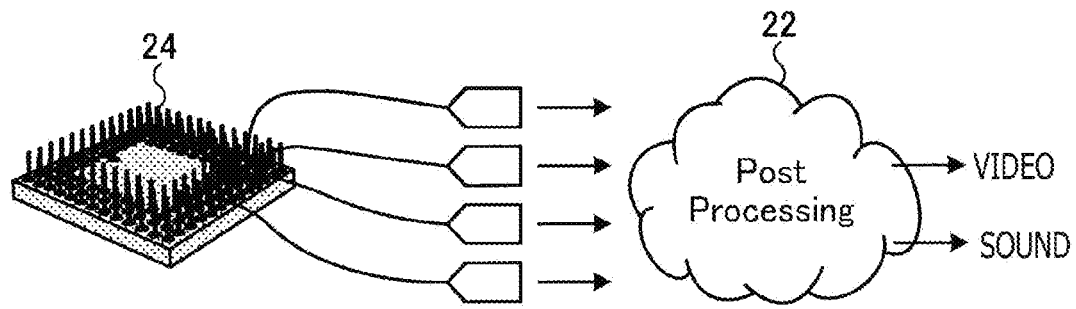
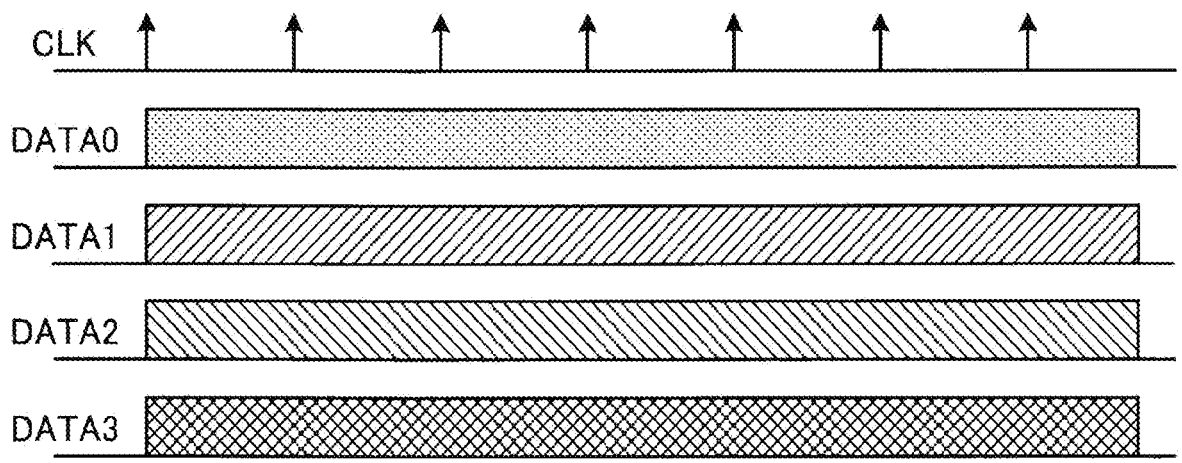
FIG.12
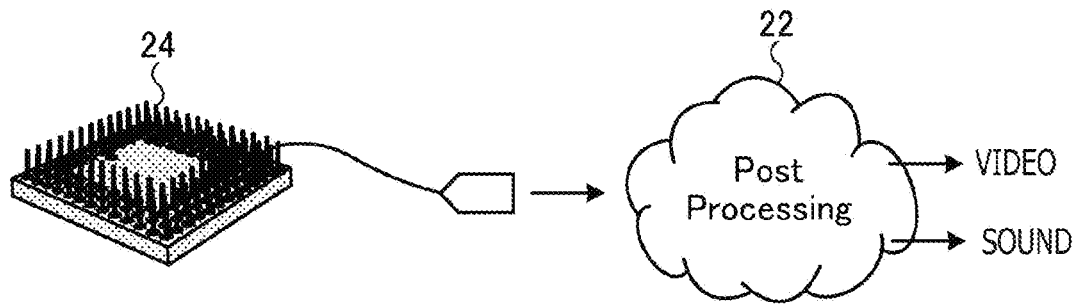
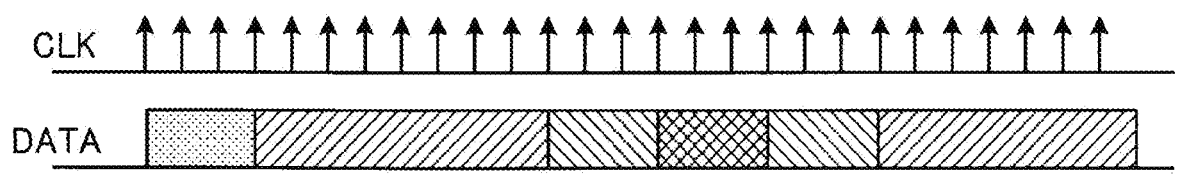

Core:QPSK
Enhanced:64QAM
4×64=256 POINTS

Core:16QAM
Enhanced:64QAM
16×64=1024 POINTS

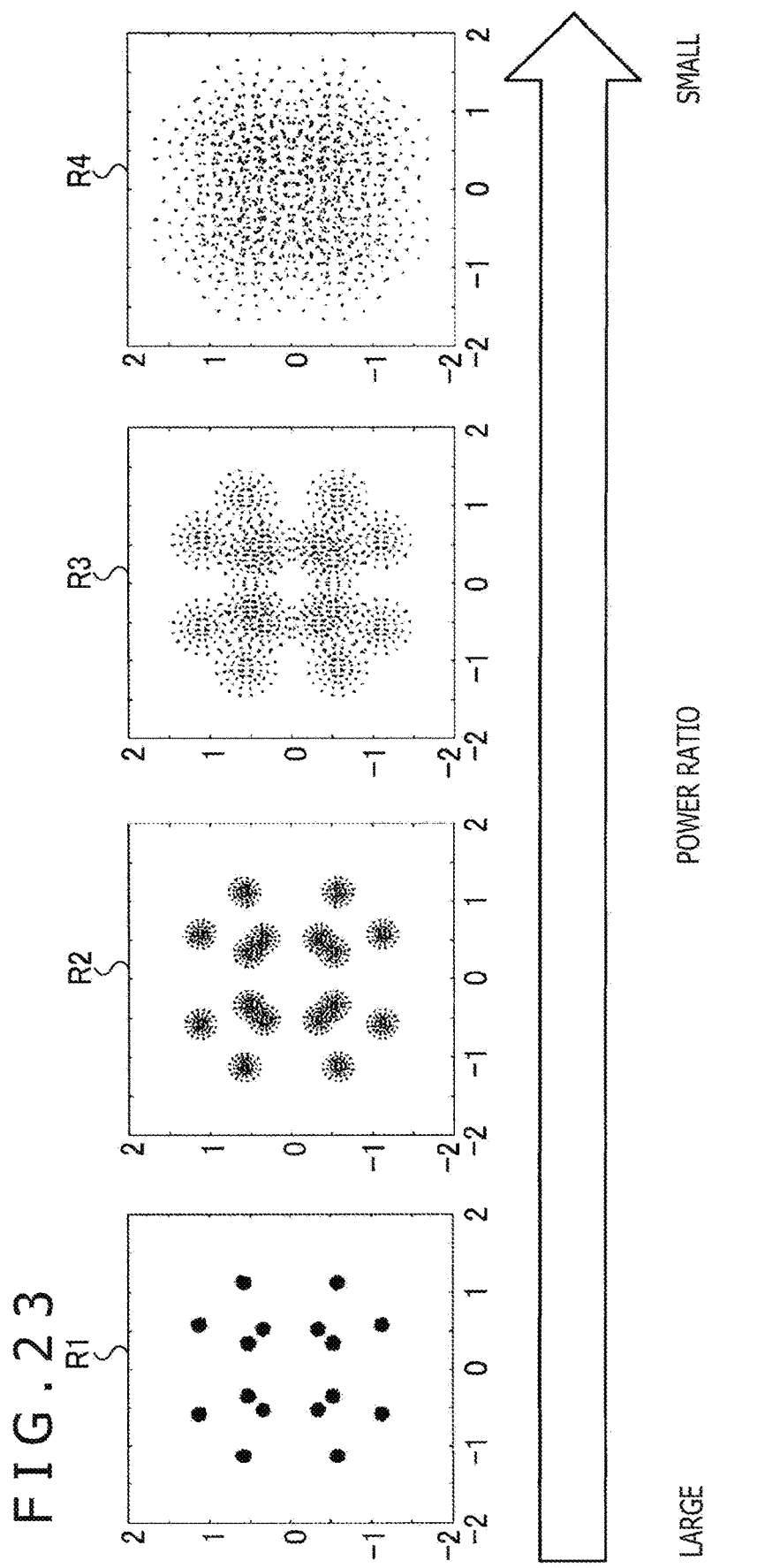

SIGNAL PROCESSING DEVICE, SIGNAL PROCESSING METHOD, AND RECEPTION DEVICE

CROSS REFERENCE TO RELATED APPLICATIONS

This application is a U.S. National Phase of International Patent Application No. PCT/JP2020/000795 filed on Jan. 14, 2020, which claims priority benefit of Japanese Patent Application No. JP 2019-014435 filed in the Japan Patent Office on Jan. 30, 2019. Each of the above-referenced applications is hereby incorporated herein by reference in its entirety.

TECHNICAL FIELD

The present disclosure relates to a signal processing device, a signal processing method, a reception device, and a signal processing program.

BACKGROUND ART

Spread of OFDM (Orthogonal Frequency Division Multiplexing) and like technologies has advanced efficient utilization of radio waves. However, there is a demand for further efficient utilization of radio waves in recent years. For example, use of LDM (Layered Division Multiplexing) has been studied for next-generation broadcasting standards, such as ATSC (Advanced Television Systems Committee) 3.0, for more efficient utilization of radio waves.

CITATION LIST

Patent Literature

[PTL 1]
JP 2017-527167T
[PTL 2]
JP 2018-504005T

Non Patent Literature

[NPL 1]
"ATSC Standard: Physical Layer Protocol" Doc. A/322: 2017, Advanced Television Systems Committee, Jun. 6, 2017

SUMMARY

Technical Problem

The use of LDM and like technologies enables efficient utilization of radio waves. However, in exchange for efficient utilization of radio waves, the use of technologies for efficient utilization of radio waves may produce a heavy processing load for processing of reception signals and data processing after processing of reception signals. A heavy processing load increases power consumption of an apparatus.

Accordingly, the present disclosure proposes a signal processing device, a signal processing method, a reception device, and a signal processing program capable of achieving reduction of a processing load.

Solution to Problem

To solve the above problem, a signal processing device according to one aspect of the present disclosure includes an acquisition unit that acquires identification information associated with data obtained by decoding a reception signal that includes a signal included in a first layer and a signal included in a different layer and superimposed on the signal of the first layer in a power axis direction, the data being output to a post-stage processing unit, a decoding unit that decodes the signal of the different layer on the basis of a result of decoding of the signal of the first layer after the decoding of the signal of the first layer, and an output control unit that outputs data obtained by decoding the signal of the different layer to the post-stage processing unit without outputting data obtained by decoding the signal of the first layer to the post-stage processing unit, in a case where data identified by the identification information is data obtained by decoding the signal of the different layer.

BRIEF DESCRIPTION OF DRAWINGS

FIG. 11 is a diagram depicting an example of a method of outputting stream data from a reception processing unit.
FIG. 12 is a diagram depicting another example of the method of outputting stream data from the reception processing unit.

FIG. 23 is a diagram depicting a constellation change produced by a power ratio (injection level) difference during enhanced layer multiplexing.

DESCRIPTION OF EMBODIMENTS

Figure 1:
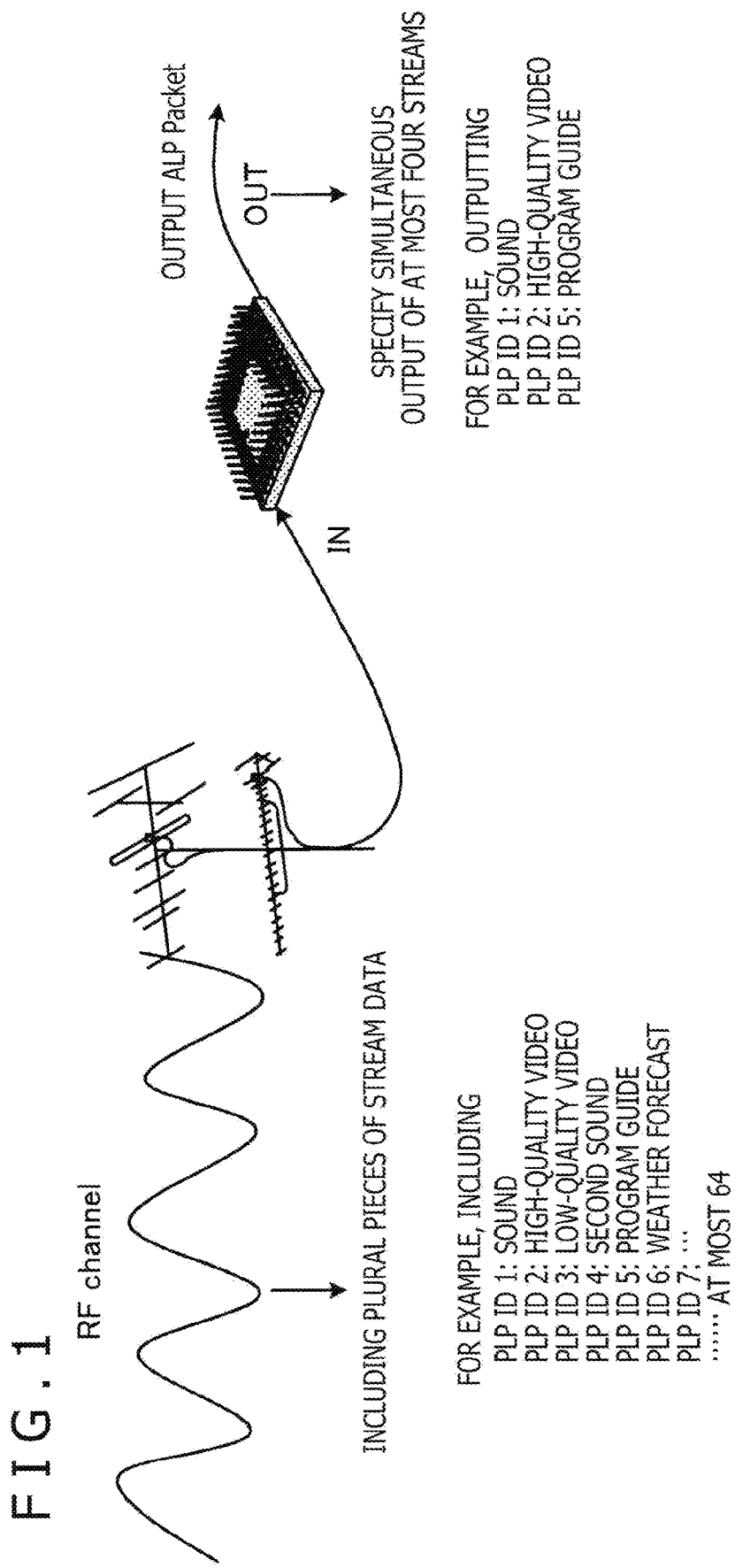
FIG. 1 is a diagram for explaining ATSC 3.0.

An embodiment of the present disclosure will be hereinafter described in detail with reference to the drawings. Note that identical parts in respective embodiments described below will be given identical reference signs to omit repetitive description.

Moreover, plural constituent elements each having a substantially identical functional configuration in the present description and the drawings will be each given a different numeral after an identical reference sign to make a distinction between these constituent elements in some cases. For example, plural configurations each having a substantially identical functional configuration will be distinguished from one another as necessary, such as reception devices 201, 202, and 203. However, plural constituent elements each having a substantially identical functional configuration will be given only an identical reference sign in a case where a distinction between the respective constituent elements is not particularly needed. For example, the reception devices 201, 202, and 203 will be only referred to as reception devices 20 in a case where no distinction between the reception devices 201, 202, and 203 is particularly needed.

Moreover, the present disclosure will be described in a following item order.

1. Introduction
    1-1. Next-generation broadcasting standards
    1-2. Signal processing by LDM
    1-3. Outline of present embodiment
2. Configuration of transfer system
    2-1. Overall configuration of transfer system
    2-2. Configuration of transmission device
    2-3. Configuration of reception device
3. Operation of transfer system
    3-1. Decoding process
    3-2. 1-step decoding and 2-step decoding
    3-3. Another example of decoding process
4. Modifications
    4-1. Modifications relating to transfer system
    4-2. Other modifications
5. Summary <<1. Introduction>>

There is a demand for more efficient utilization of radio waves in recent years. For example, use of LDM (Layered Division Multiplexing) has been studied, in addition to OFDM (Orthogonal Frequency Division Multiplexing) which utilizes orthogonality of waves, for next-generation broadcasting standards. LDM is a technology which superimposes (multiplexes) data (or signals) in a power axis direction. The use of LDM allows transmission of non-orthogonal signals at an identical frequency. Accordingly, further efficient utilization of radio waves is achievable.

ATSC (Advanced Television Systems Committee) 3.0 is one of the broadcasting standards using LDM. ATSC 3.0 is a next-generation broadcasting standard developed in the United States. A physical layer standard of ATSC 3.0 has been disclosed in NPL 1 and the like. The present embodiment will be hereinafter described while presenting ATSC 3.0 as an example. However, application of the present embodiment is not limited to a technology in conformity with ATSC 3.0. The present embodiment is also applicable to a technology in conformity with other broadcasting standards, such as DVB (Digital Video Broadcasting) and ISDB (Integrated Services Digital Broadcasting). Needless to say, the present embodiment is applicable to technologies in conformity with standards of ATSC other than ATSC 3.0.

Moreover, the present embodiment is applicable to not only broadcasting technologies, but also wireless communication technologies (radio access technologies), such as LTE (Long Term Evolution) and NR (New Radio). NR is a radio access technology (RAT) in a generation next to LTE (fifth generation) and is also called 5G NR. Note that "LTE" includes LTE-A (LTE-Advanced), LTE-A Pro (LTE-Advanced Pro), and EUTRA (Evolved Universal Terrestrial Radio Access). On the other hand, "NR" includes NRAT (New Radio Access Technology) and FEUTRA (Further EUTRA).

<1-1. Next-Generation Broadcasting Standards>

First, ATSC 3.0 which is one of next-generation broadcasting standards will be described.

FIG. 1 is a diagram for explaining ATSC 3.0. ATSC 3.0 adopts Multiple PLP which is a technology for broadcasting at most 64 pieces of stream data by one physical RF channel (hereinafter also referred to as a wireless channel). Moreover, ATSC 3.0 specifies that an ATSC 3.0 receiver receives at most four pieces of stream data.

Note that the ATSC 3.0 receiver may be a reception device itself, such as a television set, or a part of a reception device (e.g., a processor mounted on a reception device). In the following description, the ATSC 3.0 receiver will be referred to as a reception processing unit in some cases. In the example of FIG. 1, a processor disposed in a stage following an antenna corresponds to an ATSC 3.0 receiver. The processor herein may be a signal processor which has a function of decoding a reception signal (e.g., LSI (Large Scale Integration) dedicated for processing signals of ATSC 3.0).

Each piece of stream data is identified using a PLPID (=0 to 63). The ATSC 3.0 receiver outputs data in response to external designation of a received PLPID. At this time, the data may be output in the form of an ALP (ATSC Link layer Protocol) packet.

As described above, ATSC 3.0 uses LDM. LDM is a technology which superimposes (multiplexes) data (or signals) in a power direction. In a case where a plurality of pieces of data associated with a PLPID is multiplexed in a power direction in ATSC 3.0, the plurality of pieces of data is de-multiplexed on the reception side. In the following description, data (or signals) associated with a PLPID will be simply referred to as a PLPID in some cases.

<1-2. Signal Processing by LDM>

Figure 2:
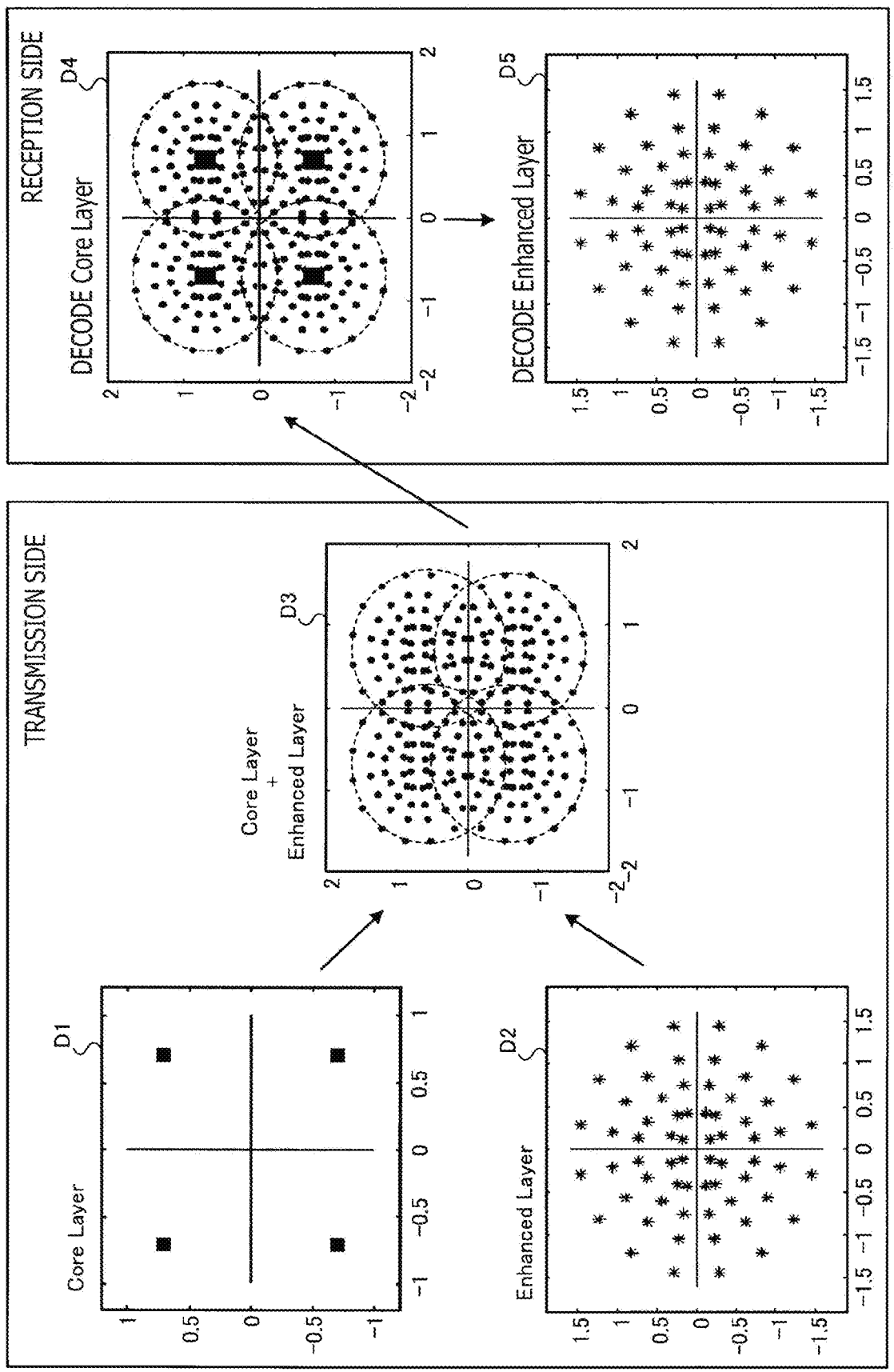
FIG. 2 is a diagram for explaining multiplexing and de-multiplexing of PLPIDs.

FIG. 2 is a diagram for explaining multiplexing and de-multiplexing of PLPIDs. FIG. 2 depicts a state where data of a core layer and data of an enhanced layer are multiplexed on the transmission side and are de-multiplexed on the reception side.

The core layer herein is a first layer of an LDM system having a plurality of layers (e.g., 2-layer LDM system), or an only one layer (Only Layer) of a non-LDM system. On the other hand, the enhanced layer is a second layer of an LDM system having a plurality of layers (e.g., 2-layer LDM system). A signal of the second layer herein is a signal at a lower power level than a signal of the first layer. The core layer can also be referred to as a layer on the "multiplexing receiving side," while the enhanced layer can also be referred to as a layer on the "multiplexing side."

Note that the LDM system may have three or more layers. In this case, each of the third or following layers can be considered as an enhanced layer. In the following description, a layer other than the first layer (second or following layers) in the LDM system will be referred to as a "different layer" in some cases. In the present embodiment, the core layer corresponds to the first layer, and the enhanced layer corresponds to the different layer.

According to ATSC 3.0, a PLPID is always classified into the multiplexing side (Core Layer) or the multiplexing receiving side (Enhanced Layer). In other words, according to ATSC 3.0, classification into the core layer or the enhanced layer is determined for each PLPID.

FIG. 2 depicts a plurality of constellations representing stages from multiplexing to de-multiplexing. In the plurality of constellations depicted in FIG. 2, a horizontal axis represents a real axis (I axis), while a vertical axis represents an imaginary axis (Q axis). It is assumed herein that data of PLPID=17 has been allocated to the core layer, and that data of PLPID=41 has been allocated to the enhanced layer in a stage prior to the "transmission side" depicted in FIG. 2.

In a processing unit on the transmission side (hereinafter referred to as a transmission processing unit), the data of PLPID=17 is mapped at any signal point on a constellation D1, and the data of PLPID=41 is mapped at any signal point on a constellation D2. The constellation D1 is a constellation produced by using QPSK (Quadrature Phase Shift Keying) and is constituted by four signal points. On the other hand, the constellation D2 is a constellation produced by 64 non-uniform constellation (NUC) which is 64 QAM (64 Quadrature Amplitude Modulation) for NUC, and is constituted by 64 signal points.

A constellation D3 is a constellation obtained by combining the constellation D1 and the constellation D2 by different power. The constellation D3 is constituted by 256 signal points. Four circles indicated by broken lines and given to the constellation D3 represent that the 64 signal points indicated in the constellation D2 are disposed around each of the four signal points indicated in the constellation D1.

More specifically, the upper right broken-line circle of the constellation D3 represents a region occupied by a group of the 64 signal points of the enhanced layer when data of the core layer (2-bit symbol) is mapped at a signal point of QPSK located at 45°. Moreover, the upper left broken-line circle of the constellation D3 represents a region occupied by a group of the 64 signal points of the enhanced layer when data of the core layer (2-bit symbol) is mapped at a signal point of QPSK located at 135°. Further, the lower left broken-line circle of the constellation D3 represents a region occupied by a group of the 64 signal points of the enhanced layer when data of the core layer (2-bit symbol) is mapped at a signal point of QPSK located at 225°. In addition, the lower left broken-line circle of the constellation D3 represents a region occupied by a group of the 64 signal points of the enhanced layer when data of the core layer (2-bit symbol) is mapped at a signal point of QPSK located at 315°.

When the power difference between the signal of the core layer and the signal of the enhanced layer is large (i.e., the power level of the core layer is high in comparison with the power level of the enhanced layer), each of the broken-line circles becomes small. On the other hand, when the power difference between the signal of the core layer and the signal of the enhanced layer is small (i.e., the power level of the core layer is not so high in comparison with the power level of the enhanced layer), each of the broken-line circles becomes large.

A signal obtained by combining the signal of the core layer and the signal of the enhanced layer is finally mapped at any one of the signal points on the constellation D3 by a device on the transmission side.

First, a processing unit on the reception side (hereinafter referred to as a reception processing unit) decodes data of the core layer (data of PLPID=17). At this time, the reception processing unit may decode the data of the core layer while handling signals of the enhanced layer as noise. According to the example of FIG. 2, each of four large squares indicated in a constellation D4 represents a signal point of the data of the core layer. Subsequently, after completion of decoding of the signal of the core layer, the reception processing unit decodes the data of the enhanced layer (data of PLPID=41) by canceling a decoding result (the decoded signal of the core layer) from a reception signal. According to the example of FIG. 2, each of 64 signal points indicated in the constellation D5 represents a signal point of the data of the core layer.

In addition, in a case of reproduction of signals obtained by data multiplexing using LDM, data of the enhanced layer is generally decoded after decoding of data of the core layer. In other words, decoding of data of the core layer is generally required for decoding data of the enhanced layer. In general, "decoding" and "receiving" refers to an identical action. Accordingly, in a case where the reception processing unit receives a signal obtained by multiplexing one piece of PLP data of the core layer and one piece of PLP data of the enhanced layer, resultant output is data corresponding to two PLP data.

Figure 3:
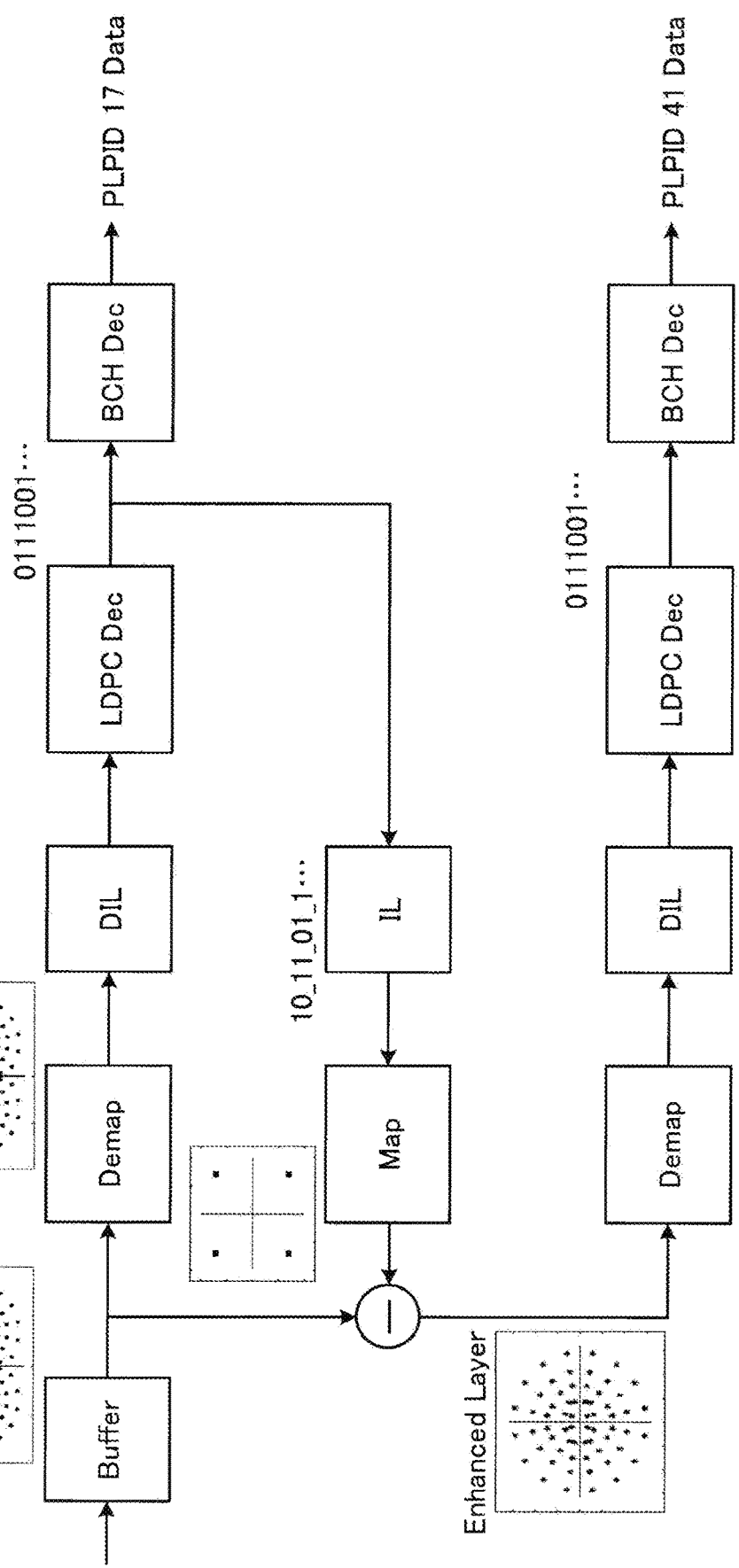
FIG. 3 is a diagram for explaining an ordinary decoding process using LDM.

This point will be described in detail with reference to the drawing. FIG. 3 is a diagram for explaining an ordinary decoding process using LDM. A signal received by an antenna is buffered after passing through an RF circuit and the like. For easy understanding, it is assumed in the following description that the buffered signal is a signal obtained by multiplexing data of PLPID=17 of the core layer and data of PLPID=41 of the enhanced layer. It is further assumed that the modulation method of the data of the core layer is a QPSK method, and that the modulation method of the enhanced layer is a 64 NUC method. In this case, 64 NUC is 64 QAM for NUC.

The reception processing unit demaps the buffered reception signal using QPSK, and then deinterleaves (DIL) the reception signal. Subsequently, the reception processing unit corrects errors of the deinterleaved data using an LDPC decoder and a BCH coder and decodes the data of PLPID=17. The reception processing unit outputs the decoded data of PLPID=17 to the outside.

Moreover, the reception processing unit interleaves (IL) data output from the LDPC decoder, and then maps the data using QPSK to restore a core layer signal. Subsequently, the reception processing unit cancels the core layer signal restored from the buffered reception signal to restore an enhanced layer signal.

Thereafter, the reception processing unit demaps the restored enhanced layer signal using 64 NUC, and then executes deinterleaving. After deinterleaving, the reception processing unit corrects errors of the deinterleaved data using an LDPC decoder and a BCH decoder and decodes the data of PLPID=41. The reception processing unit outputs the decoded data of PLPID=41 to the outside.

As described above, in a case of reception of a signal obtained by multiplexing one piece of PLP data of the core layer and one piece of PLP data of the enhanced layer, resultant output is data corresponding to two PLP data.

<1-3. Outline of Present Embodiment>

However, following problems are assumed to arise from the reception process described above.

[Problem 1]

A first problem is that the reception processing unit is unable to decode data only by designating data of the enhanced layer (e.g., PLPID=41).

Figure 4:
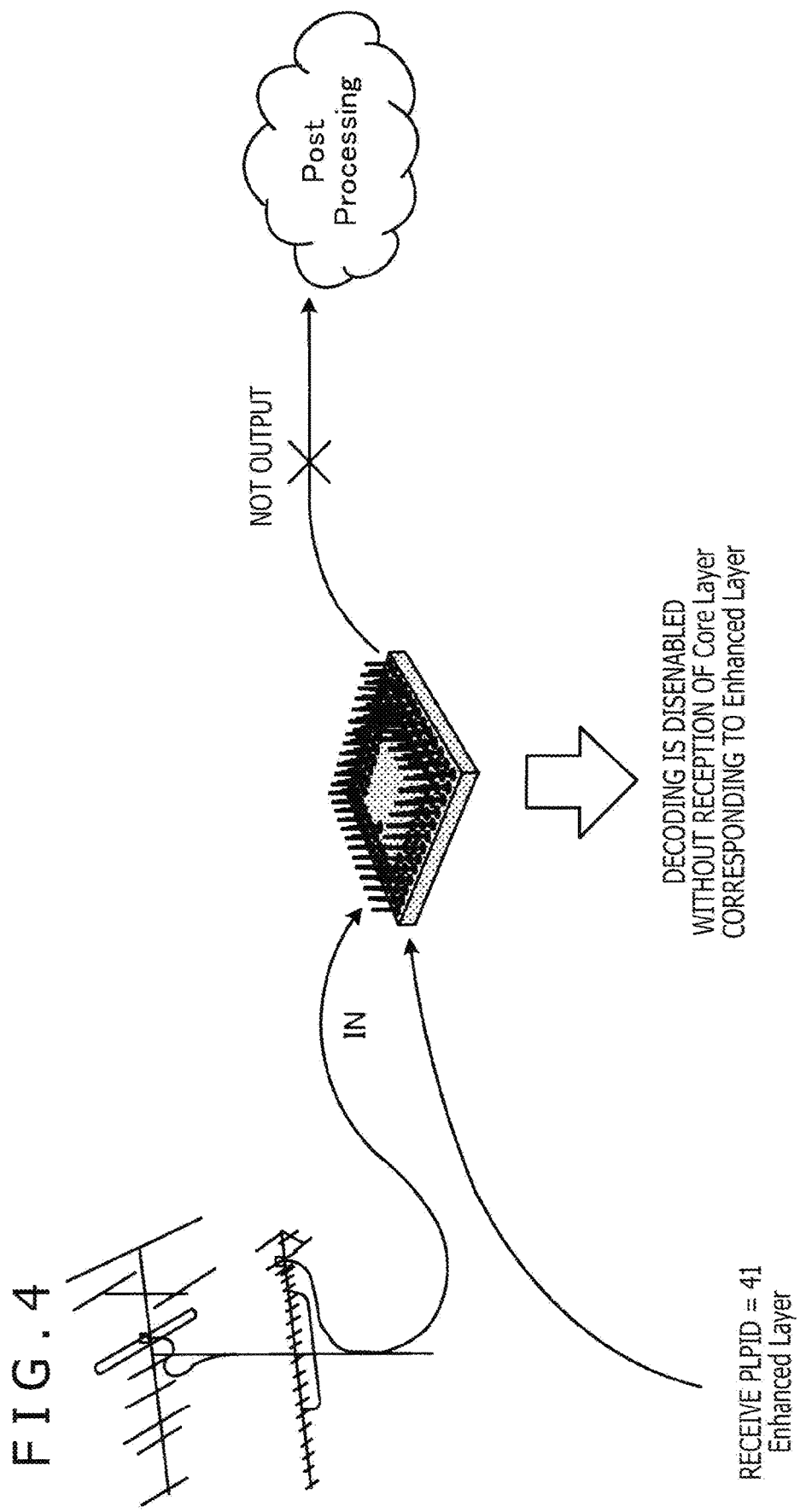
FIG. 4 is a diagram for explaining a first problem of the present embodiment.

FIG. 4 is a diagram for explaining the first problem of the present embodiment. For example, suppose that the reception device desires to receive only PLPID=41 in the reception signal. As described above, PLPID=41 is data of the enhanced layer. In this case, the reception processing unit included in the reception device also needs to decode (receive) PLPID=17 as data of the core layer as well. However, the reception processing unit is unable to identify data of the core layer corresponding to PLPID=41 only by receiving a command "receive PLPID=41 Enhanced Layer" from a control unit of the reception device as depicted in FIG. 4, for example. Accordingly, the reception processing unit is unable to decode PLPID=41.

Figure 5:
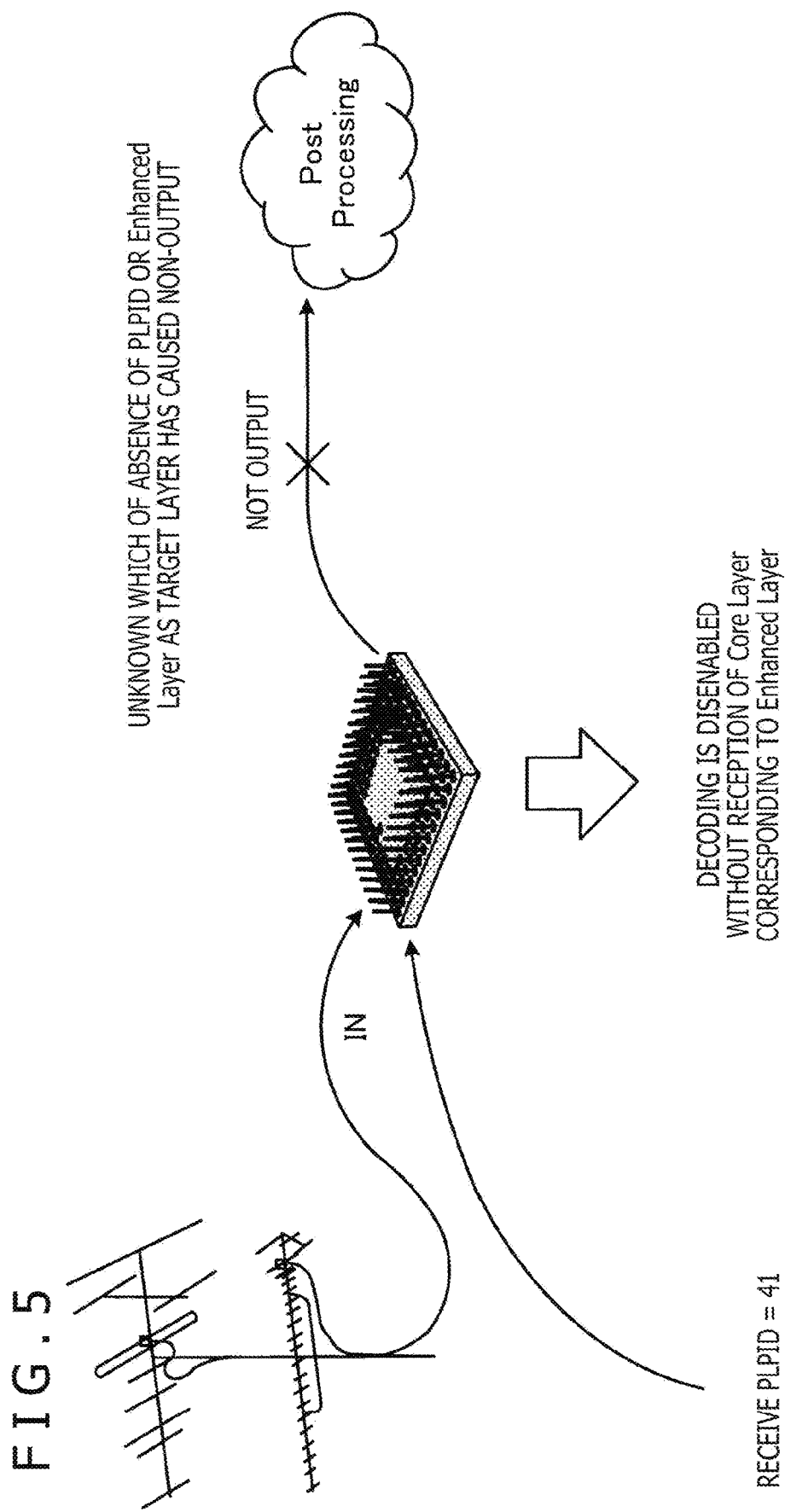
FIG. 5 is a diagram for explaining a problem of the present embodiment.

In addition, in a case where data is not output from the reception processing unit, the reception device cannot determine whether data is not output from the reception processing unit because the PLPID is absent, or because the target layer is the enhanced layer, as depicted in FIG. 5. Accordingly, a heavy load for processing errors is imposed on the reception device depending on cases.

[Problem 2]

For solving Problem 1, it is considered that the reception processing unit is configured to identify data of the core layer (e.g., PLPID=17) corresponding to designated data of the enhanced layer (e.g., PLPID=41). In this case, the reception processing unit is capable of decoding data of data of the enhanced layer (e.g., PLPID=41), but inevitably outputs data of the core layer (e.g., PLPID=17) as well as the data of the enhanced layer (e.g., PLPID=41).

Figure 6:
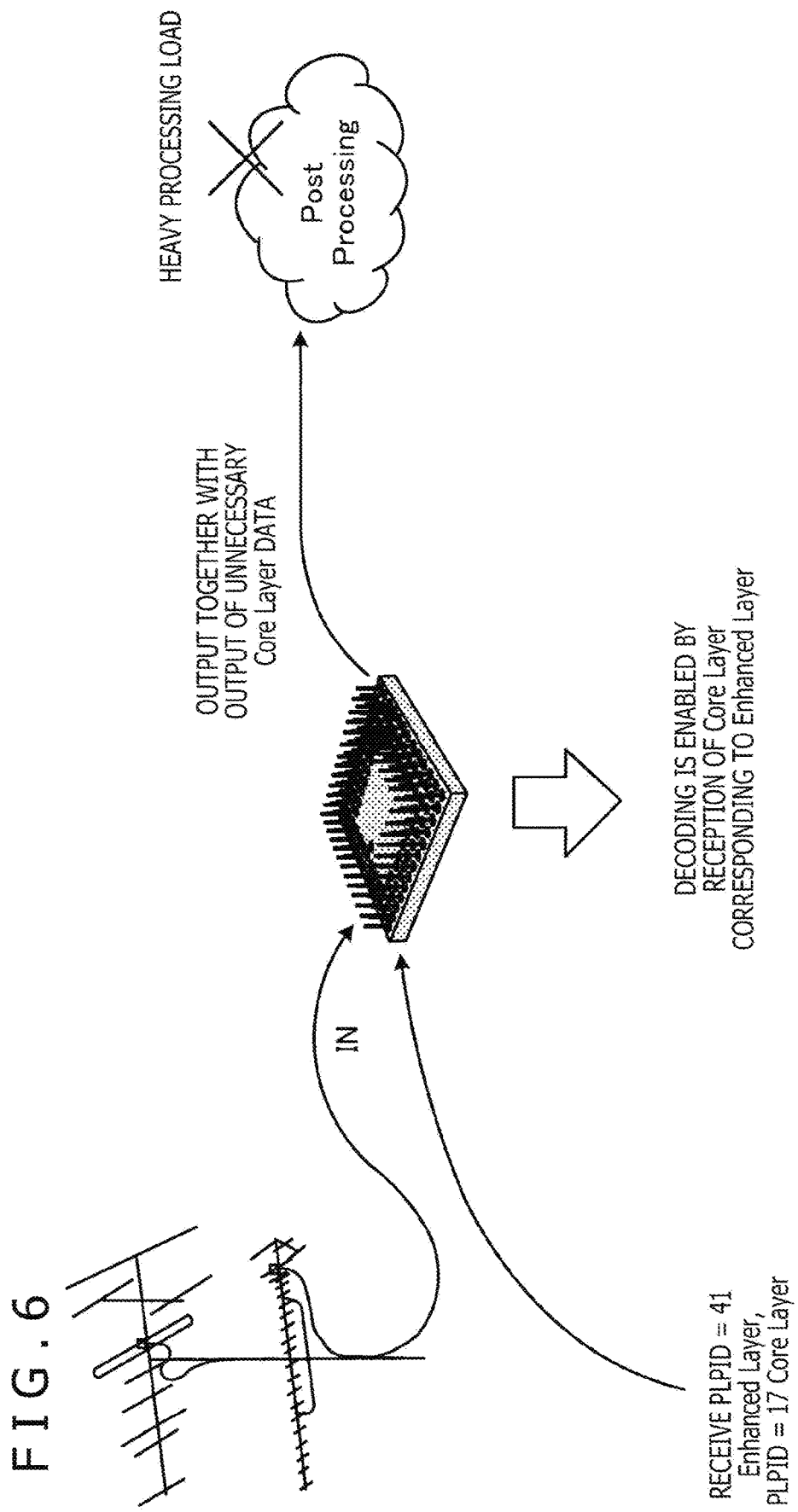
FIG. 6 is a diagram for explaining a second problem of the present embodiment.

FIG. 6 is a diagram for explaining a second problem of the present embodiment. For example, suppose that the reception device desires to receive only PLPID=41 in the reception signal. It is assumed herein that the reception processing unit receives a command "receive PLPID=41 Enhanced Layer, PLPID=17 Core Layer" from the control unit of the reception device. In this case, the reception processing unit is capable of decoding PLPID=41 on the basis of recognition that data of the core layer corresponding to PLPID=41 is PLPID=17. In this case, however, the reception processing unit inevitably outputs PLPID=17 in addition to PLPID=41 originally desired to be received by the reception device.

As a result, an additional processing load is imposed on a post-stage processing unit (Post Processing Unit) receiving output from the reception processing unit. For example, if the post-stage processing unit uses a time-division output format, the post-stage processing unit is required to execute a data division process. Power consumption of the reception device increases as the processing load becomes heavier.

[Outline of Present Embodiment]

Accordingly, a signal processing device of the present embodiment (e.g., a reception processing unit included in a reception device) acquires identification information associated with data obtained by decoding a reception signal which includes a signal included in a core layer and a signal included in an enhanced layer and multiplexed on the signal of the core layer, as data output to a post-stage processing unit. Subsequently, the signal processing device decodes the signal of the core layer, and then decodes the signal of the enhanced layer on the basis of a result of the decoding. Thereafter, in a case where data identified by the identification information is data obtained by decoding the signal of the enhanced layer, the signal processing device outputs data obtained by decoding the signal of the enhanced layer to the post-stage processing unit without outputting data obtained by decoding the signal of the core layer to the post-stage processing unit.

In this manner, a heavy processing load is not imposed on at least data processing after processing of the reception signal. Accordingly, the signal processing device can reduce the processing load on the reception device. As a result, the signal processing device achieves reduction of power consumption of the reception device.

Note that the signal processing device according to the present embodiment is not limited to the reception processing unit, but may be a reception device itself on which the reception processing unit is mounted.

<<2. Configuration of Transfer System>>

A transfer system 1 according to the embodiment of the present disclosure will be hereinafter described.

<2-1. Overall Configuration of Transfer System>

Figure 7:
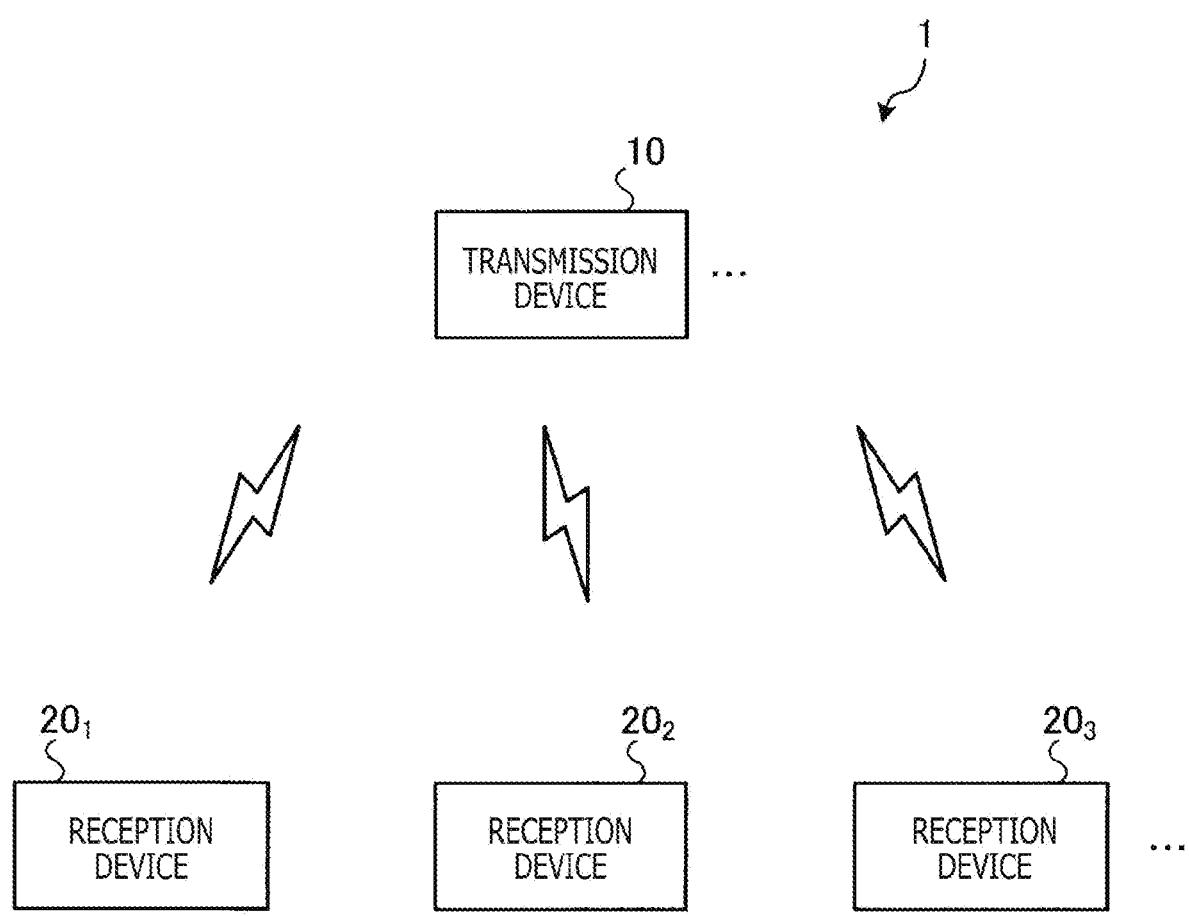
FIG. 7 is a diagram depicting a configuration example of a transfer system according to the embodiment of the present disclosure.

FIG. 7 is a diagram depicting a configuration example of the transfer system 1 according to the embodiment of the present disclosure. The transfer system 1 is a system for transmitting stream data (e.g., stream data for broadcasting), such as video data and audio data. For example, the transfer system 1 is a broadcasting system such as a television broadcasting system or a radio broadcasting system. For example, the transfer system 1 executes data transfer in conformity with a broadcasting method such as ATSC 3.0.

Note that data transfer executed by the transfer system 1 is not limited to data transfer in conformity with ATSC 3.0. Data transfer executed by the transfer system 1 of the present embodiment may be data transfer in conformity with other broadcasting standards, such as DVB (Digital Video Broadcasting) and ISDB (Integrated Services Digital Broadcasting). Needless to say, data transfer executed by the transfer system 1 may be data transfer in conformity with standards of ATSC other than ATSC 3.0.

Moreover, a transfer path used for data transfer by the transfer system 1 is not limited to a path using ground waves. For example, the transfer path may be a wireless channel using waves other than ground waves, such as satellite waves used for satellite broadcasting. Further, the transfer path may be a wired line such as a cable used for cable broadcasting.

Moreover, the transfer system 1 is not necessarily limited to a broadcasting system such as a television broadcasting system or a radio broadcasting system. The transfer system 1 may be a wireless communication system. For example, the transfer system 1 may be a cellular communication system using a radio access technology such as LTE or NR. In this case, data transferred by the transfer system 1 is not necessarily limited to stream data such as video data and audio data.

As depicted in FIG. 7, the transfer system 1 includes transmission devices 10 and reception devices 20.

[Transmission Device]

For example, the transmission device 10 is a device which transmits stream data such as video data (e.g., content data of TV programs or the like) and audio data (e.g., content data of radio programs). For example, the transmission device 10 is an ATSC 3.0 transmitter.

Note that the transmission device 10 is not limited to an ATSC 3.0 transmitter, but may be a transmitter in conformity with other broadcasting standards such as DVB and ISDB. Moreover, the transmission device 10 may be a broadcasting station (broadcasting station as a facility) such as a broadcasting relay station.

Moreover, the transmission device 10 may be a wireless station other than a broadcasting station. For example, the transmission device 10 may be a wireless communication station constituting a wireless communication system such as LTE or NR. In a case where the transfer system 1 is a wireless communication system, the transmission device 10 may be a device corresponding to a wireless base station, a wireless access point, or a wireless relay station. In this case, the transmission device 10 may be a base station or a relay station for a cellular communication system such as LTE or NR.

Note that the transfer system 1 may be a wired system such as a wired broadcasting system or a wired communication system. In this case, the transmission device 10 may be a transmitter for wired broadcasting or wired communication.

Note that the concept of the wireless station (also referred to as a wireless station device) includes not only a doner station (e.g., a doner broadcasting station and a doner base station) but also a relay station (also referred to as a relay station device). Moreover, the concept of the wireless station includes not only a structure having a function of a wireless station, but also a device installed on a structure.

For example, the structure is a building such as a high-rise building, a house, a steel tower, a station facility, an airport facility, a port facility, or a stadium. Note that the concept of the structure includes not only a building, but also a non-building structure such as a tunnel, a bridge, a dam, a wall, or an iron pole, and a facility such as a crane, a gate, or a windmill. Further, the concept of the structure includes not only a structure on the land (on the ground in a narrow sense) or under the ground, but also a structure on the water such as a pier and a mega-float, and a structure under the water such as an ocean observation facility.

Note that the transmission device 10 may be either a fixed station or a mobile station. The wireless station constituting the fixed station or the mobile station may be either a broadcasting station or a wireless communication station. In a case where the transmission device 10 is a mobile station, the transmission device 10 may be either a device installed on a mobile body, or a mobile body itself. For example, a relay station device having a moving ability (Mobility) can be considered as the transmission device 10 as a mobile station. On the other hand, a device which originally has a moving ability and has a function of a wireless station device (at least a partial function of a wireless station device), such as a vehicle, a drone, or a smartphone, also corresponds to the transmission device 10 as a mobile station.

Moreover, the transmission device 10 may be a ground station installed on the ground (ground station device). The ground station may be either a broadcasting station or a wireless communication station. For example, the transmission device 10 may be a wireless station device disposed on a structure on the ground, or a wireless station device installed on a mobile body moving on the ground. More specifically, the transmission device 10 may be an antenna installed on a structure such as a building, or a signal processing device connected to the antenna. Needless to say, the transmission device 10 may be a structure or a mobile body itself. The range "on the ground" refers to not only a range on the land (on the ground in a narrow sense), but also a range on the ground in a wide sense including a range under the ground, on the water, and under the water.

Note that the transmission device 10 is not limited to a ground station device. The transmission device 10 may be a non-ground station device capable of floating in the air or in outer space. For example, the transmission device 10 may be an aircraft station device or a satellite station device.

The aircraft station device is a wireless device capable of floating in the atmosphere, such as an aircraft. The aircraft station device may be a device mounted on an aircraft or the like, or an aircraft itself. Note that the concept of the aircraft includes not only a heavier-than-air aircraft such as an airplane and a glider, but also a lighter-than-air aircraft such as a balloon or an airship. Moreover, the concept of the aircraft includes not only a heavier-than-air aircraft and a lighter-than-air aircraft, but also a rotorcraft such as a helicopter or an auto-gyro. Note that the aircraft station device (or the aircraft on which the aircraft station device is mounted) may be an unmanned aerial vehicle such as a drone.

Note that the concept of the unmanned aerial vehicle includes an unmanned aircraft system (UAS) and a tethered unmanned aircraft system (tethered UAS). Moreover, the concept of the unmanned aerial vehicle includes a lighter-than-air unmanned aircraft system (LTA: Lighter than Air UAS), and a heavier-than air unmanned aircraft system (HTA: Heavier than Air UAS). In addition, the concept of the unmanned aerial vehicle also includes a high altitude unmanned aircraft system platform (HAPs: High Altitude UAS Platforms).

The satellite station device is a wireless device capable of floating outside the atmosphere. The satellite station device may be a device mounted on a space mobile body, or a space mobile body itself. The space mobile body is a mobile body moving outside the atmosphere, such as an artificial satellite. A satellite constituting the satellite station device may be any one of a low earth orbiting (LEO) satellite, a medium earth orbiting (MEO) satellite, a geostationary (GEO: Geostationary Earth Orbiting) satellite, a highly elliptical orbiting (HEO) satellite. Needless to say, the satellite station device may be a device mounted on a low earth orbiting satellite, a medium earth orbiting satellite, a geostationary satellite, or a highly elliptical orbiting satellite.

Note that the transmission device 10 may have a reception function. In this case, the reception function may be similar to the reception function of the reception device 20.

[Reception Device]

The reception device 20 is a device which receives signals transmitted from the transmission device 10. For example, the reception device 20 is an ATSC 3.0 receiver. Note that the reception device 20 is not limited to an ATSC 3.0 receiver, but may be a receiver in conformity with other broadcasting standards such as DVB and ISDB. Moreover, the reception device 20 may be a receiver of wireless communication. For example, the reception device 20 may be a receiver capable of receiving communication which uses a radio access technology such as LTE or NR for wireless communication.

For example, the reception device 20 is a television receiver or a radio receiver. Needless to say, the reception device 20 is not limited to a television receiver or a radio receiver, but may be a terminal device such as a cellular phone, a smart device (a smartphone or a tablet-type device), a wearable terminal, a PDA (Personal Digital Assistant), or a personal computer.

Moreover, the reception device 20 may be a conversion device which converts information transferred by a predetermined broadcasting method (or a predetermined communication method) into information using another broadcasting method (or another communication method). For example, the reception device 20 may be a device which converts content (e.g., television program) broadcasted by a new broadcasting method into content (e.g., television program) using a conventional broadcasting method and transmits the converted content to a conventional receiver.

Further, the reception device 20 may be an image recorder or a sound recorder which records received videos or sounds. In addition, the reception device 20 may be an M2M (Machine to Machine) device or an IoT (Internet of Things) device.

Besides, the reception device 20 may be a wireless device (hereinafter referred to as a mobile body device) which is movable and has a function of receiving information transmitted from the transmission device 10. In this case, the reception device 20 as a mobile body device may be either a wireless device installed on a mobile body, or a mobile body itself. For example, the reception device 20 may be a vehicle moving on the land, such as a car, a bus, a truck, or a motorcycle, or a wireless device mounted on the vehicle.

Note that the "mobile body device" is a type of wireless device, and is also called a mobile station, a mobile station device, a terminal device, or a terminal. The concept of the "mobile body device" includes not only a wireless device configured to be movable, but also a mobile body on which a wireless device is installed.

The mobile body herein may be a mobile terminal such as a smartphone or a cellular phone. Moreover, the mobile body may be a mobile body moving on the land (on the ground in a narrow sense) (e.g., a vehicle such as a car, a bicycle, a bus, a truck, a motorcycle, a train, or a linear motor car), or a mobile body moving under the ground (e.g., in a tunnel) (e.g., a subway).

Further, the mobile body may be a mobile body moving on the water (e.g., a vessel such as a passenger ship, a cargo ship, or a hovercraft), or may be a mobile body moving under the water (e.g., a submergible vehicle such as a submersible, a submarine, or an unmanned submersible).

In addition, the mobile body may be a mobile body moving in the atmosphere (e.g., an aircraft such as an airplane, an airship, or a drone), or may be a mobile body moving outside the atmosphere (e.g., an artificial celestial body such as an artificial satellite, a spaceship, a space station, or a space probe). The mobile body moving outside the atmosphere can be also referred to as a space mobile body.

Further, the reception device 20 may be a wireless station. In this case, the reception device may be either a doner station or a relay station. Moreover, the reception device 20 may be either a fixed station or a mobile station. In a case where the transmission device 10 is a mobile station, the transmission device 10 may be either a device installed on a mobile body, or a mobile body itself. A device which originally has a moving ability and has a function of a wireless station device (at least a partial function of a wireless station device), such as a vehicle, a drone, or a smartphone, also corresponds to the reception device 20 as a mobile station.

Moreover, the reception device 20 may be a ground station (ground station device). For example, the reception device 20 may be a wireless station device disposed on a structure on the ground, or a wireless station device installed on a mobile body moving on the ground.

Note that the reception device 20 is not limited to a ground station device. The reception device 20 may be a non-ground station device capable of floating in the air or in outer space. For example, the transmission device 10 may be an aircraft station device or a satellite station device. The aircraft station device and the satellite station device herein may be similar to the "aircraft station device" and the "satellite station device" having appeared in the description of the configuration of the transmission device 10. For example, the aircraft station device may include an unmanned aerial vehicle such as a drone. In this case, for example, the unmanned aerial vehicle may function as a relay station which relays information transmitted from the transmission device 10 to other devices.

Note that the reception device 20 may have a transmission function. In this case, the transmission function may be similar to the transmission function of the transmission device 10. In this case, the reception device 20 may communicate with another reception device 20 (by side link). Side link communication may be achieved using a transmission function similar to the transmission function of the transmission device 10. For example, the reception device 20 may transmit information to the other reception device 20 using LDM. In this case, the reception device 20 may superimpose a signal having low power in a frequency band used by existing wireless devices to transmit information to the other reception device 20 without greatly influencing communication of the existing wireless devices.

Respective configurations of the transmission device 10 and the reception device 20 will be hereinafter described in detail.

<2-2. Configuration of Transmission Device>

Figure 8:
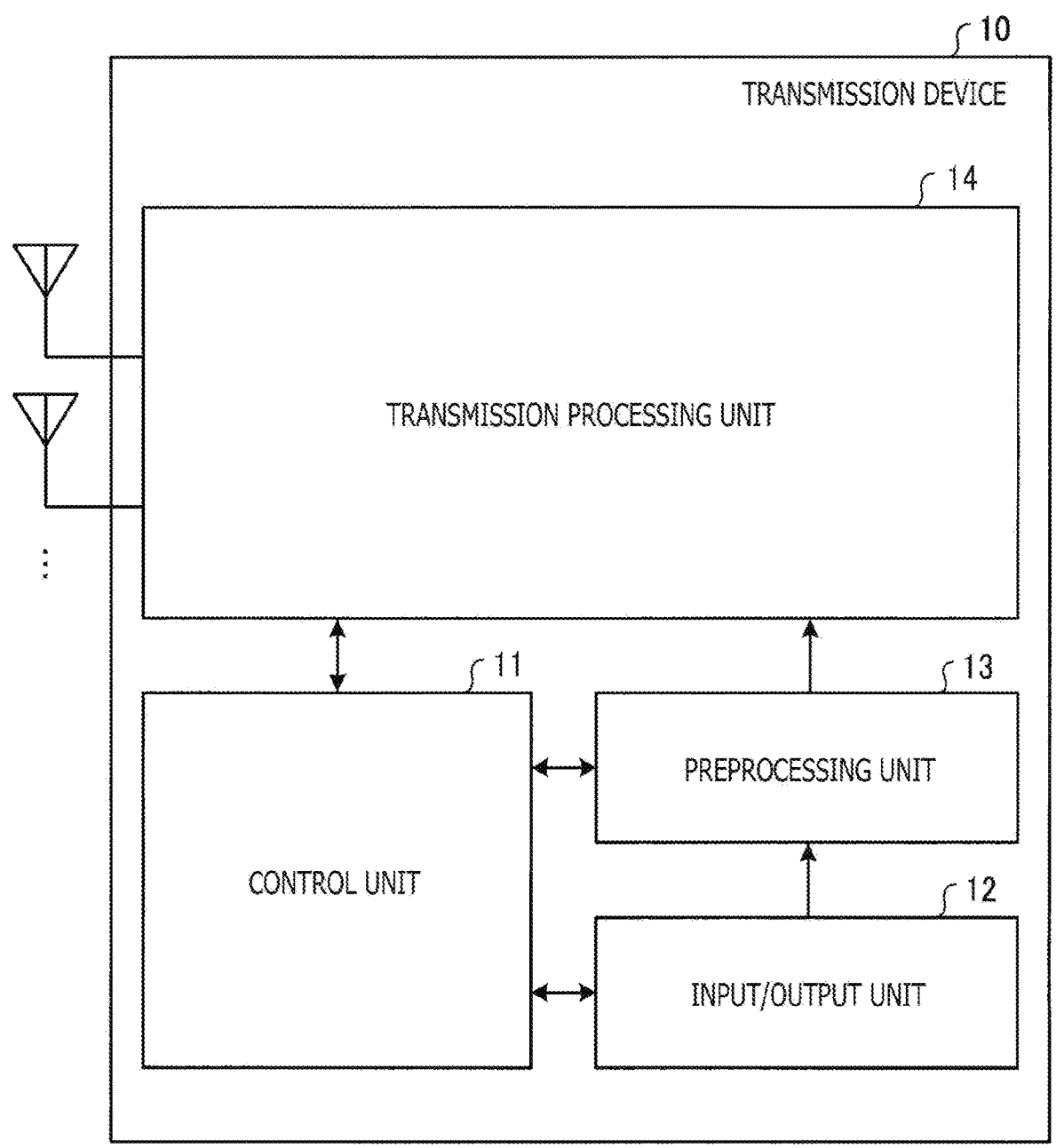
FIG. 8 is a diagram depicting a configuration example of a transmission device according to the embodiment of the present disclosure.

FIG. 8 is a diagram depicting a configuration example of the transmission device 10 according to the embodiment of the present disclosure. It is assumed in the following description that the transmission device 10 is a device only for transmission by way of example. However, the transmission device 10 may have a reception function. In this case, the reception function may be similar to the reception function of the reception device 20. For example, the reception function may be a reception function using LDM. Note that the transmission device having a reception function can be also referred to as a "communication device."

The transmission device 10 includes a control unit 11, an input/output unit 12, a preprocessing unit 13, and a transmission processing unit 14. Note that the configuration depicted in FIG. 8 is a functional configuration. A hardware configuration may be different from this configuration. Moreover, the function of the transmission device 10 may be mounted while distributed into a plurality of physically separated configurations.

The control unit 11 is a controller which controls respective units of the transmission device 10. For example, the control unit 11 is implemented by a processor such as a CPU (Central Processing Unit) or an MPU (Micro Processing Unit). For example, the control unit 11 is implemented under various types of programs stored in a storage device inside the transmission device 10 and executed by the processor using a RAM (Random Access Memory) or the like as a work area. Note that the control unit 11 may be implemented by an integrated circuit such as an ASIC (Application Specific Integrated Circuit) or an FPGA (Field Programmable Gate Array). The CPU, the MPU, the ASIC, and the FPGA each can be considered as a controller.

The input/output unit 12 is a device which acquires data associated with data transfer from other devices (or users) and outputs a data transfer result or the like to other devices (or users). For example, the input/output unit 12 is a communication interface for communicating with other devices. In this case, the input/output unit 12 may be a network interface, or an apparatus connection interface. In this case, the input/output unit 12 may have a function of directly or indirectly connecting to a network. For example, the input/output unit 12 may have a LAN (Local Area Network) interface such as an NIC (Network Interface Card) or have a USB (Universal Serial Bus) interface constituted by a USB host controller, a USB port, or the like.

Note that the input/output unit 12 may be either a wired interface, or a wireless interface. The input/output unit 12 acquires data from other devices (e.g., device constituting Studio Infrastructure) as data to be transmitted by the transmission processing unit 14.

The preprocessing unit 13 preprocesses data to be transmitted by the transmission processing unit 14. For example, the preprocessing unit 13 performs input formatting of data acquired by the input/output unit 12 (e.g., data of television program).

For example, the preprocessing unit 13 executes encapsulation, compression, or the like for data acquired by the input/output unit 12, to generate an ALP packet. At this time, data input to the preprocessing unit 13 may be plural pieces of stream data each associated with one corresponding PLPID (e.g., PLPID 1: sound, PLPID 2: high-quality video, etc.). Which of the core layer or the enhanced layer includes each PLPID may be determined beforehand. Moreover, the generated ALP packet may correspond to respective PLPIDs. In this case, a plurality of ALP packets may be generated for one PLPID.

Thereafter, the preprocessing unit 13 executes baseband formatting for each ALP packet, to generate a baseband packet. The generated baseband packet may correspond to respective PLPIDs. In this case, a plurality of baseband packets may be generated for one PLPID. Then, the preprocessing unit 13 outputs the generated baseband packet to the transmission processing unit 14.

The transmission processing unit 14 performs a transmission process for transmitting transmission data. The transmission processing unit 14 may be implemented by a processor such as a DSP (Digital Signal Processor). In this case, the reception processing unit 24 may be a processor formed integrally with the control unit 21, or a separate processor. The transmission processing unit 14 executes BICM (Bit-Interleaved and Coded Modulation) and executes LDM combining for the baseband packet. LDMM combining may be also referred to as layer synthesis.

For example, the transmission processing unit 14 executes forward error correction (FEC) coding for the baseband packet, to generate an FEC frame. At this time, the transmission processing unit 14 may execute error correction coding for the baseband packet while designating a BCH code as an external code and an LDPC (Low-Density Parity-Check code) as an internal code, to generate the FEC frame. The generated FEC frame may correspond to respective PLPIDs. In this case, a plurality of FEC frames may be generated for each PLPID.

Thereafter, the transmission processing unit 14 executes bit interleaving for the FEC frame and maps the FEC frame at signal points on a constellation (Constellation points) by a predetermined modulation method. At this time, a plurality of bits corresponding to PLPIDs of the core layer may be mapped at signal points of a constellation produced by QPSK. Moreover, a plurality of bits corresponding to PLPIDs of the enhanced layer may be mapped at signal points of a constellation produced by QAM (Quadrature Amplitude Modulation). In this case, QAM may be any one of 16 QAM, 64 QAM, and 256 QAM. The constellation produced by QAM may be a non-uniform constellation (NUC).

Subsequently, the transmission processing unit 14 combines signals (complex cells) corresponding to the PLPIDs of the core layer and signals (complex cells) corresponding to the PLPIDs of the enhanced layer at power levels different from each other. The transmission processing unit 14 may perform time interleaving and frequency interleaving for the combined signals. Thereafter, the transmission processing unit 14 performs OFDM modulation for the combined signals and outputs the signals from an antenna.

Note that the configurations of the preprocessing unit 13 and the transmission processing unit 14 described above are configurations on an assumption that the transfer system 1 is an ATSC 3.0 transfer system. However, needless to say, the configurations of the preprocessing unit 13 and the transmission processing unit 14 of the present embodiment are not limited to the configurations described above. The configurations of the preprocessing unit 13 and the transmission processing unit 14 may be modified as appropriate in accordance with standards or the like to be adopted.

<2-3. Configuration of Reception Device>

Figure 9:
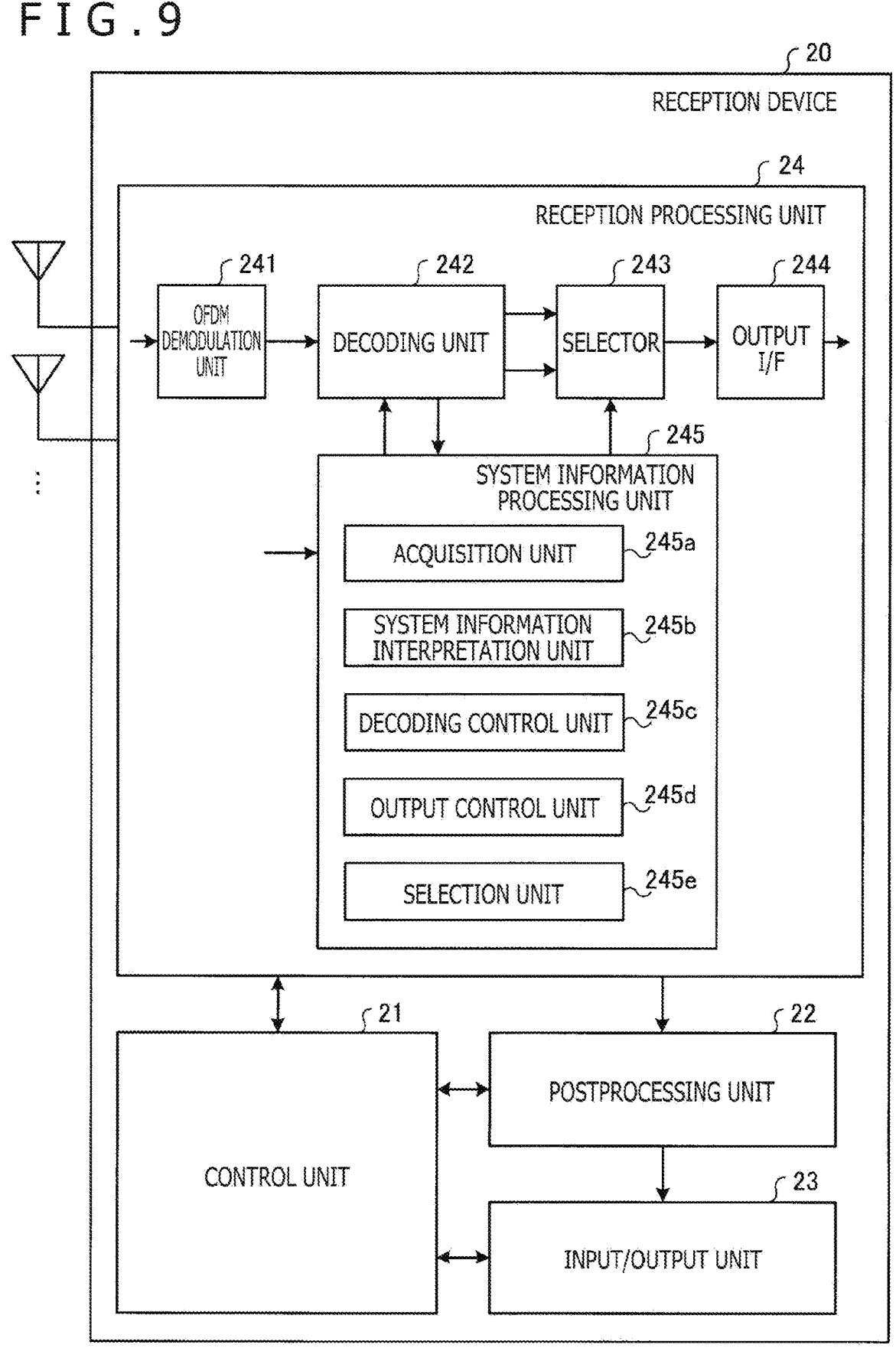
FIG. 9 is a diagram depicting a configuration example of a reception device according to the embodiment of the present disclosure.

FIG. 9 is a diagram depicting a configuration example of the reception device 20 according to the embodiment of the present disclosure. It is assumed in the following description that the reception device 20 is a device only for reception by way of example. However, the reception device 20 may have a transmission function. In this case, the transmission function may be similar to the transmission function of the transmission device 10. For example, the transmission function may be a transmission function using LDM. Note that the reception device having a transmission function can be also referred to as a "communication device."

The reception device 20 includes a control unit 21, a postprocessing unit 22, an input/output unit 23, and a reception processing unit 24. Note that the configuration depicted in FIG. 9 is a functional configuration. A hardware configuration may be different from this configuration. Moreover, the function of the reception device 20 may be mounted while distributed into a plurality of physically separated configurations.

As described above, the "signal processing device" according to the present embodiment is not limited to the reception processing unit 24 included in the reception device 20, but may be the reception device 20 itself. In this case, the "post-stage processing unit" may be either a device inside the reception device 20 (e.g., postprocessing unit 22), or a device outside the reception device 20.

The control unit 21 is a controller which controls respective units of the reception device 20. For example, the control unit 21 is implemented by a processor such as a CPU or an MPU. For example, the control unit 21 is implemented under various types of programs stored in a storage device inside the transmission device 10 and executed by the processor using a RAM or the like as a work area. Note that the control unit 21 may be implemented by an integrated circuit such as an ASIC or an FPGA. The CPU, the MPU, the ASIC, and the FPGA each can be considered as a controller.

The postprocessing unit 22 is a processing unit (post-stage processing unit) which performs processing in a stage after the reception processing unit 24 (or a decoding unit 242). The postprocessing unit 22 may be constituted by a processor different from the reception processing unit 24. Moreover, the postprocessing unit 22 may be located either inside the reception device 20 or outside the reception device 20. Note that the postprocessing unit 22 may be included in the reception processing unit 24 if processing is performed in a stage after the decoding unit 242.

For example, the postprocessing unit 22 performs output formatting of data output from the reception processing unit 24 (e.g., ALP packet). For example, the preprocessing unit 13 executes decompression, decapsulation, and the like, to generate stream data. The postprocessing unit 22 outputs the stream data to the input/output unit 23.

Note that the configuration of the postprocessing unit 22 described above is a configuration on an assumption that the transfer system 1 is an ATSC 3.0 transfer system. However, needless to say, the configuration of the postprocessing unit 22 of the present embodiment is not limited to the configuration described above. The configuration of the postprocessing unit 22 may be modified as appropriate in accordance with standards or the like to be adopted.

The input/output unit 23 is a user interface for exchanging information with a user. For example, the input/output unit 23 is a liquid crystal display, an organic EL display (Organic Electroluminescence Display), or other types of display device. Alternatively, the input/output unit 23 is an acoustic device such as a speaker or a buzzer. The input/output unit 23 may be an operation device through which the user performs various types of operations, such as a keyboard, a mouse, operation keys, or a touch panel. Moreover, the input/output unit 23 may be a lighting device such as an LED (Light Emitting Diode) lamp.

Further, the input/output unit 23 may be a communication interface for communicating with other devices. In this case, the input/output unit 12 may be a network interface, or an apparatus connection interface. In this case, the input/output unit 12 may have a function of directly or indirectly connecting to a network. For example, the input/output unit 12 may include a LAN interface such as an NIC, or include a USB interface constituted by a USB host controller, a USB port, or the like.

Note that the input/output unit 12 may be a wired interface, or a wireless interface. The input/output unit 12 acquires data from other devices (e.g., device constituting Studio Infrastructure) as data to be transmitted by the transmission processing unit 14.

The reception processing unit 24 (signal processing device) performs a reception process for receiving a signal transmitted from the transmission device 10. The reception processing unit 24 may be implemented by a processor (or an integrated circuit) such as a DSP. In this case, the reception processing unit 24 may be a processor (or an integrated circuit) formed integrally with the control unit 21, or a separate processor (or an integrated circuit).

As depicted in FIG. 9, the reception processing unit 24 includes an OFDM demodulation unit 241, a decoding unit 242, a selector 243, an output interface 244, and a system information processing unit 245. Note that the configuration of the reception processing unit 24 described below is a configuration on an assumption that the transfer system 1 is an ATSC 3.0 transfer system. However, needless to say, the configuration of the reception processing unit 24 of the present embodiment is not limited to the configuration described below. The configuration described below may be modified as appropriate in accordance with standards or the like to be adopted.

The OFDM demodulation unit 241 performs OFDM demodulation for a signal transmitted from the transmission device 10. For example, the OFDM demodulation unit 241 outputs the OFDM-demodulated signal to the decoding unit 242.

The decoding unit 242 decodes PLPID data from the signal (reception signal) output from the OFDM demodulation unit 241. The reception signal is a signal generated by the LDM method. Specifically, the reception signal is a signal obtained by multiplexing a signal of the enhanced layer on a signal of the core layer in a power axis direction. For example, the decoding unit 242 decodes PLPID data of the core layer from the reception signal, and then cancels a decoding result (the decoded signal of the core layer) from the reception signal (Cancellation) to decode PLPID data of the enhanced layer. The decoding unit 242 outputs the decoded PLPID data to the selector 243. At this time, if both the PLPID data of the core layer and the PLPID data of the enhanced layer are decoded, the decoding unit 242 outputs the PLPID data of both the core layer and the enhanced layer to the selector 243. Note that the PLPID data may be an ALP packet.

Figure 10:
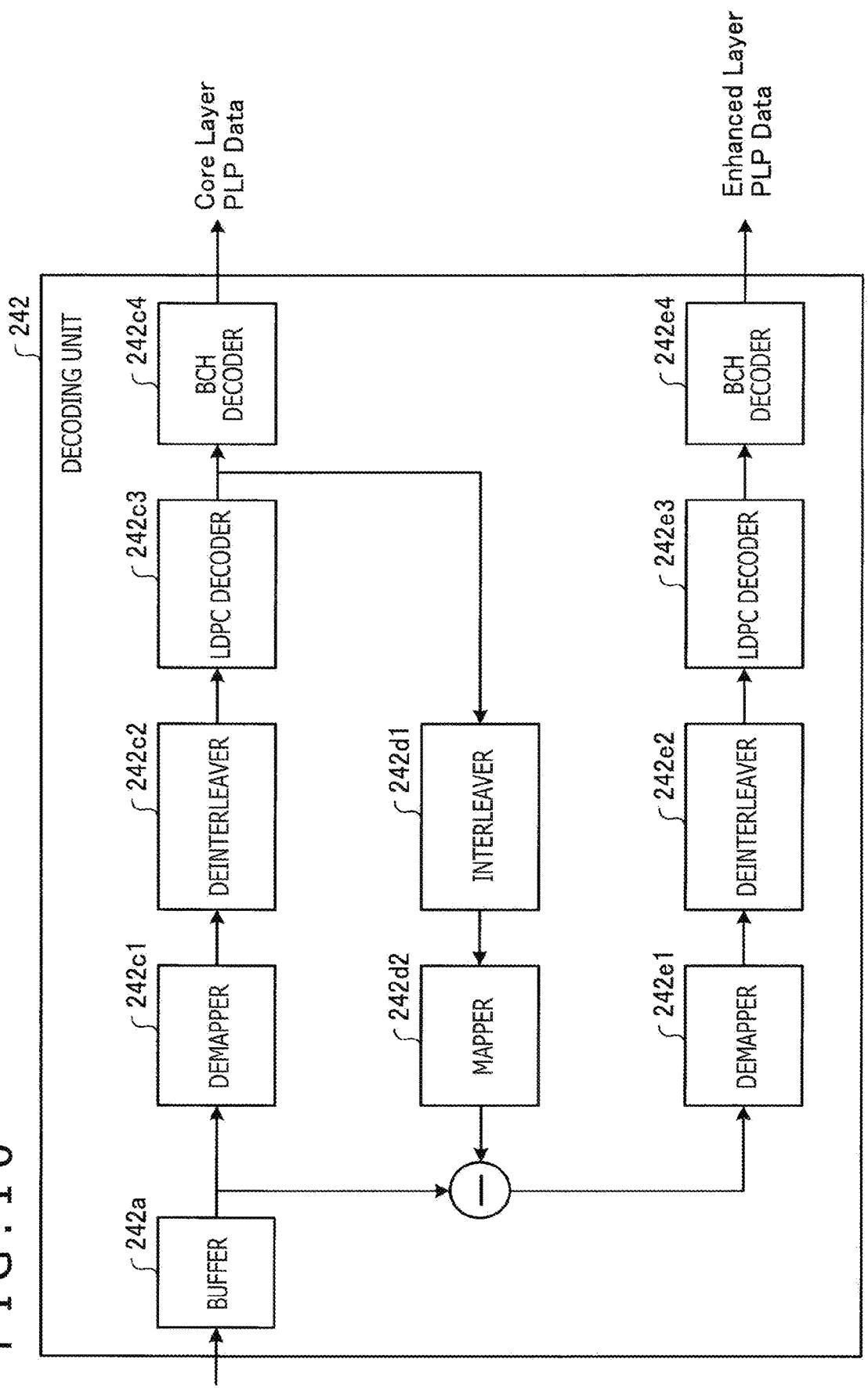
FIG. 10 is a diagram depicting a configuration example of a decoding unit.

FIG. 10 is a diagram depicting a configuration example of the decoding unit 242. The decoding unit 242 includes a buffer 242*a*, a demapper 242*c*1, a deinterleaver 242*c*2, an LDPC decoder 242*c*3, a BCH decoder 242*c*4, an interleaver 242*d*1, a mapper 242*d*2, a demapper 242*e*1, a deinterleaver 242*e*2, an LDPC decoder 242*e*3, and a BCH decoder 242*e*4.

Note that each of the blocks (the buffer 242*a* to the BCH decoder 242*e*4) constituting the decoding unit 242 is a function block representing a corresponding function of the decoding unit 242. These function blocks may be either software blocks or hardware blocks. For example, each of the function blocks described above may be one software module implemented by software (including microprogram), or one circuit block on a semiconductor chip (die). Needless to say, each of the function blocks may be one processor or one integrated circuit. A configuration method of the function blocks may be any method. Note that the decoding unit 242 may be configured in units of function different from the function blocks described above.

Moreover, the configuration of the decoding unit 242 described below is a configuration on an assumption that the transfer system 1 is an ATSC 3.0 transfer system. However, needless to say, the configuration of the decoding unit 242 of the present embodiment is not limited to the configuration described below. The configuration described below may be modified as appropriate in accordance with standards or the like to be adopted. For example, in a case where the transfer system 1 a transfer system in conformity with a standard other than ATSC 3.0, such as ISDB or NR, terms such as "system information (L1 information)," a "core layer," an "enhanced layer," and a "PLPID" are replaced with corresponding terms as appropriate.

The respective blocks constituting the decoding unit 242 will be hereinafter described.

First, a signal (reception signal) output from the OFDM demodulation unit 241 is buffered by the buffer 242*a*.

Thereafter, the demapper 242*c*1 demaps the buffered reception signal by a predetermined modulation method. For example, if the modulation method of the core layer signal is QPSK, the demapper 242*c*1 demaps the buffered reception signal by using QPSK. Subsequently, the deinterleaver 242*c*2 deinterleaves the demapped signal. Thereafter, each of the LDPC decoder 242*c*3 and the BCH decoder 242*c*4 corrects errors of deinterleaved data and decodes PLPID data. The decoding unit 242 outputs the decoded PLPID data of the core layer to the selector 243.

Subsequently, the interleaver 242*d*1 and the mapper 242*d*2 each interleave (IL) data output from the LDPC decoder 242*c*3, and then maps the data using QPSK. As a result, the core layer signal is restored. Thereafter, the decoding unit 242 cancels the core layer signal restored from the reception signal buffered by the buffer 242*a* to restore an enhanced layer signal.

Subsequently, the demapper 242*e*1 demaps the restored enhanced layer signal by a predetermined modulation method. For example, if the modulation method of the enhanced layer signal is 64 QAM (64 NUC), the demapper 242e1 demaps the enhanced layer signal by using 64 QAM (64 NUC). Thereafter, the deinterleaver 242e2 deinterleaver the demapped signal. Then, the LDPC decoder 242e3 and the BCH decoder 242e4 each correct errors of the deinterleaved data and decodes PLPID data of the core layer. The decoding unit 242 outputs the decoded PLPID data of the enhanced layer to the selector 243.

Returning to FIG. 9, the selector 243 selects data to be output to the outside of the decoding unit 242. For example, in a case where a plurality of pieces of PLPID data including PLPID data of the core layer and PLPID data of the enhanced layer is output from the decoding unit 242, the selector 243 selects one or a plurality of pieces of PLPID data to be output to the outside of the decoding unit 242 from the plurality of pieces of PLPID data, according to control by the system information processing unit 245. The selector 243 outputs the selected data to the output interface 244.

The output interface 244 is an interface for outputting PLPID data to the outside of the decoding unit 242. As described with reference to FIG. 1, ATSC 3.0 specifies simultaneous output of at most 4 streams. Following two patterns are assumed as output methods.

FIG. 11 is a diagram depicting an example of a method of outputting stream data from the reception processing unit 24. A first pattern is a method which separately outputs each of pieces of four stream data. For example, suppose that the decoding unit 242 is an LSI including a plurality of pins. In this case, the output interface 244 outputs four pieces of stream data concurrently using four pins.

FIG. 12 is a diagram depicting another example of the method of outputting stream data from the reception processing unit 24. A second pattern is a method which outputs four pieces of stream data on time-division basis. For example, suppose that the decoding unit 242 is an LSI including a plurality of pins. In this case, the output interface 244 outputs the four pieces of stream data using one pin on time-division basis. In reality, a pin output resource of an LSI is limited. Accordingly, it is considered that the second pattern is more likely to be selected.

Note that a PGA (Pin Grid Array) type LSI is presented as the reception processing unit 24 in FIGS. 11 and 12. However, the semiconductor package is not limited to the PGA, but may be a QFP (Quad Flat Package) or a BGA (Ball Grid Array), for example.

Returning to FIG. 9, the system information processing unit 245 acquires system information from the reception signal and controls respective units of the decoding unit 242 on the basis of the system information. Note that, while the reception processing unit 24 includes the system information processing unit 245 in the example of FIG. 9, the control unit 21 may include the system information processing unit 245. Needless to say, the system information processing unit 245 may be constituted by a processor (or an integrated circuit) different from the processors (or the integrated circuits) constituting the reception processing unit 24 and the control unit 21.

The system information processing unit 245 includes an acquisition unit 245a, a system information interpretation unit 245b, a decoding control unit 245c, an output control unit 245d, and a selection unit 245e.

Note that each of the blocks (the acquisition unit 245a to the selection unit 245e) constituting the system information processing unit 245 is a function block representing a corresponding function of the system information processing unit 245. These function blocks may be either software blocks or hardware blocks. For example, each of the function blocks described above may be one software module implemented by software (including microprogram), or one circuit block on a semiconductor chip (die). Needless to say, each of the function blocks may be one processor or one integrated circuit. A configuration method of the function blocks may be any method.

Note that the system information processing unit 245 may be configured in units of function different from the function blocks described above. Operations of the respective blocks of the system information processing unit 245 will be described below in detail.

<<3. Operation of Transfer System>>

An operation of the transfer system 1 will be subsequently described. In the following description, processing associated with decoding of a reception signal will be chiefly touched upon.

<3-1. Decoding Process>

Figure 13:
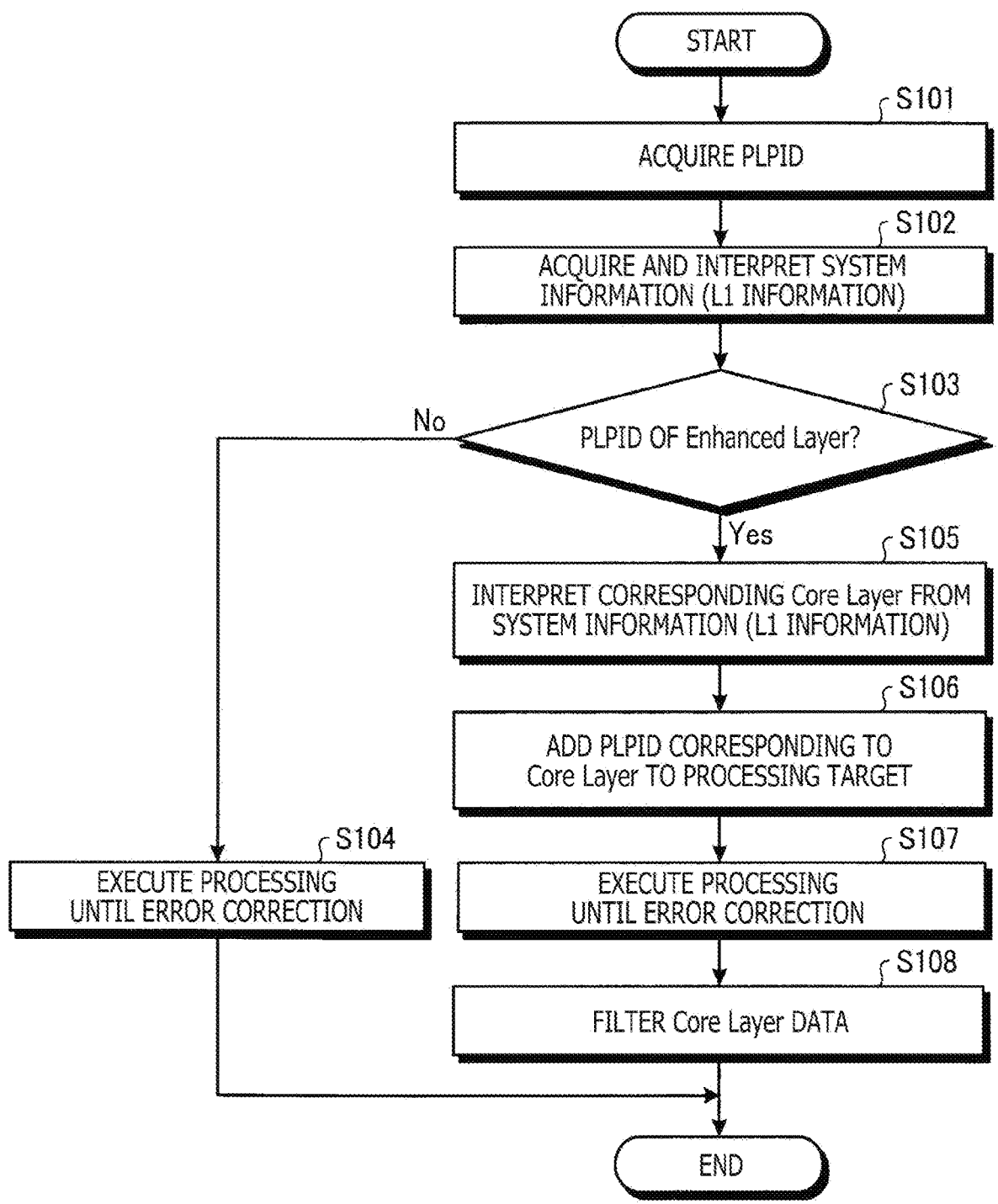
FIG. 13 is a flowchart presenting a decoding process according to the embodiment of the present disclosure.

FIG. 13 is a flowchart presenting a decoding process according to the embodiment of the present disclosure. The decoding process presented in FIG. 13 is a process for decoding a reception signal demodulated by the OFDM demodulation unit 241, to generate stream data (PLPID data). The decoding process described below is executed by the reception processing unit 24 of the reception device 20, for example. More specifically, the decoding process is executed by the system information processing unit 245 of the reception processing unit 24.

The decoding process will be hereinafter described with reference to FIG. 13. Note that the process described below is a process on an assumption that the transfer system 1 is an ATSC 3.0 transfer system. However, needless to say, the decoding process of the present embodiment is not limited to the process described below. The process described below may be modified as appropriate in accordance with standards or the like to be adopted. For example, in a case where the transfer system 1 a transfer system in conformity with a standard other than ATSC 3.0, such as ISDB or NR, terms such as "system information (L1 information)," a "core layer, an "enhanced layer," and a "PLPID" are replaced with corresponding terms as appropriate.

First, the acquisition unit 245a of the reception processing unit 24 acquires, from the control unit 21, identification information indicating data associated with an output request (i.e., PLPID desired to be received by the reception device 20) (step S101). Subsequently, the system information interpretation unit 245b of the reception processing unit 24 acquires and interprets system information (L1 information) (step S102). The system information (L1) may be acquired by the acquisition unit 245a. Following Tables 1-1 to 1-3 are tables each presenting an example of system information (L1-Detail Signaling Fields and Syntax). Numerals in the leftmost column in each of the tables each represent a row number.

TABLE 1-1

| | Syntax | No. of Bits |
|---|---|---|
| 1 | L1_Detail signaling( ) { | |
| 2 | L1D_version | 4 |
| 3 | L1D_num_rf | 3 |
| 4 | for (L1D_rf_id=1 .. L1D_num_rf) { | |
| 5 | L1D_bonded_bsid | 16 |
| 6 | reserved | 3 |
| 7 | } | |
| 8 | if (L1B_time_info_flag != 00) { | |
| 9 | L1D_time_sec | 32 |
| 10 | L1D_time_msec | 10 |
| 11 | if (L1B_time_info_flag != 01) { | |

TABLE 1-1-continued

| | Syntax | No. of Bits |
|---|---|---|
| 12 | L1D_time_usec | 10 |
| 13 | if (L1B_time_info_flag != 10) { | |
| 14 | L1D_time_nsec | 10 |
| 15 | } | |
| 16 | } | |
| 17 | } | |
| 18 | | |
| 19 | for (i=0 .. L1B_num_subframes) { | |
| 20 | if (i > 0) { | |
| 21 | L1D_mimo | 1 |
| 22 | L1D_miso | 2 |
| 23 | L1D_fft_size | 2 |
| 24 | L1D_reduced_carriers | 3 |
| 25 | L1D_guard_interval | 4 |
| 26 | L1D_num_ofdm_symbols | 11 |
| 27 | L1D_scattered_pilot_pattern | 5 |
| 28 | L1D_scattered_pilot_boost | 3 |
| 29 | L1D_sbs_first | 1 |
| 30 | L1D_sbs_last | 1 |
| 31 | } | |
| 32 | if (L1B_num_subframes>0) { | |
| 33 | L1D_subframe_multiplex | 1 |
| 34 | } | |
| 35 | L1D_frequency_interleaver | 1 |
| 36 | if ((i=0)&&(L1B_first_sub_sbs_first ‖ (L1B_first_sub_sbs_last)) ‖ | |

TABLE 1-2

| | Syntax | No. of Bits |
|---|---|---|
| 37 | ((i>0)&&(L1D_sbs_first | L1D_sbs_last))) { | |
| 38 | L1D_sbs_null_cells | 13 |
| 39 | } | |
| 40 | L1D_num_plp | |
| 41 | | |
| 42 | for (j=0 .. L1D_num_plp) { | |
| 43 | L1D_plp_id | 6 |
| 44 | L1D_plp_lls_flag | 1 |
| 45 | L1D_plp_layer | 2 |
| 46 | L1D_plp_start | 24 |
| 47 | L1D_plp_size | 24 |
| 48 | L1D_plp_scrambler_type | 2 |
| 49 | L1D_plp_fec_type | 4 |
| 50 | if (L1D_plp_fec_type ∈ {0,1,2,3,4,5}) { | |
| 51 | L1D_plp_mod | 4 |
| 52 | L1D_plp_cod | 4 |
| 53 | } | |
| 54 | L1D_plp_TI_mode | 2 |
| 55 | if (L1D_plp_TI_mode=00) { | |
| 56 | L1D_plp_fec_block_start | 15 |
| 57 | } else if (L1D_plp_TI_mode=01) { | |
| 58 | L1D_plp_CTI_fec_block_start | 22 |
| 59 | } | |
| 60 | if (L1D_num_rf>0) { | |
| 61 | L1D_plp_num_channel_bonded | 3 |
| 62 | if (L1D_plp_num_channel_bonded>0) { | |
| 63 | L1D_plp_channel_bonding_format | 2 |
| 64 | for (k=0..L1D_plp_num_channel_bonded){ | |
| 65 | L1D_plp_bonded_rf_id | 3 |
| 66 | } | |
| 67 | } | |
| 68 | } | |
| 69 | if (i=0 && L1B_first_sub_mimo=1) ‖ (i > I && L1D_mimo=1) { | |
| 70 | L1D_plp_mimo_stream_combining | 1 |
| 71 | L1D_plp_mimo_IQ_interleaving | 1 |
| 72 | L1D_plp_mimo_PH | 1 |

TABLE 1-3

| | Syntax | No. of Bits |
|---|---|---|
| 73 | } | |
| 74 | if (L1D_plp_layer=0) { | |
| 75 | L1D_plp_type | 1 |
| 76 | if (L1D_plp_type=1) { | |
| 77 | L1D_plp_num_subslices | 14 |
| 78 | L1D_plp_subslice_interval | 24 |
| 79 | } | |
| 80 | if (((L1D_plp_TI_mode=01) ‖ | |
| 81 | (L1D_plp_TI_mode=10))&& (L1D_plp_mod=0000)) { | |
| 82 | L1D_plp_TI_extended_interleaving | 1 |
| 83 | } | |
| 84 | if (L1D_plp_TI_mode=01) { | |
| 85 | L1D_plp_CTI_depth | 3 |
| 86 | L1D_plp_CTI_start_row | 11 |
| 87 | }else if (L1D_plp_TI_mode=10) { | |
| 88 | L1D_plp_HTI_inter_subframe | 1 |
| 89 | L1D_plp_HTI_num_ti_blocks | 4 |
| 90 | L1D_plp_HTI_num_fec_blocks_max | 12 |
| 91 | if (L1D_plp_HTI_inter_subframe-0) { | |
| 92 | L1D_plp_HTI_num_fec_blocks | 12 |
| 93 | }else { | |
| 94 | for (k=0..L1D_plp_HTI_num_ti_ blocks) { | |
| 95 | L1D_plp_HTI_num_fec_blocks | 12 |
| 96 | } | |
| 97 | } | |
| 98 | L1D_plp_HTI_cell_interleaver | 1 |
| 99 | } | |
| 100 | }else { | |
| 101 | L1D_plp_ldm_injection_level | 5 |
| 102 | } | |
| 103 | } | |
| 104 | } | |
| 105 | L1D_bsid | 16 |
| 106 | L1D_reserved | as needed |
| 107 | L1D_crc | 32 |
| 108 | } | |

Processing in step S102 will be hereinafter described with reference to Tables 1-1 to 1-3.

First, the system information interpretation unit 245b checks whether identification information (PLPID desired to be received by the reception device 20) is included in the system information by comparing the identification information with L1D_plp_id. L1D_plp_id is indicated in a row number 43 in Table 1-2.

Then, in a case where a value of L1D_plp_layer corresponding to the matching PLPID is 1 or larger, the system information interpretation unit 245b determines that the PLPID associated with the identification information is a PLPID of the enhanced layer. On the other hand, in a case where the value of L1D_plp_layer corresponding to the matching PLPID is 0, the system information interpretation unit 245b determines that the PLPID associated with the identification information is a PLPID of the core layer. Note that an L1D_plp_layer parameter is given to each PLPID. L1D_plp_layer is indicated in a row number 45 in Table 1-2.

Subsequently, the decoding control unit 245c of the reception processing unit 24 determines, on the basis of an interpretation result of the system information, whether the identification information (PLPID) acquired in step S101 is a PLPID of the enhanced layer (step S103).

In a case where the identification information acquired in step S101 is not a PLPID of the enhanced layer, i.e., in a case where the identification information acquired in step S101 is a PLPID of the core layer (step S103: No), the decoding control unit 245c executes processing until error correction (e.g., BCH decoder 242c4 depicted in FIG. 10) by controlling the decoding unit 242 (step S104). In this manner, only PLPID data (data of the core layer) designated by the identification information is output from the reception processing unit 24. After output of the PLPID data, the reception processing unit 24 ends the decoding process.

On the other hand, in a case where the identification information acquired in step S101 is a PLPID of the enhanced layer (step S103: Yes), the system information interpretation unit 245b interprets, on the basis of the system information, a PLPID of the core layer corresponding to the PLPID of the enhanced layer (step S105).

Figure 14:
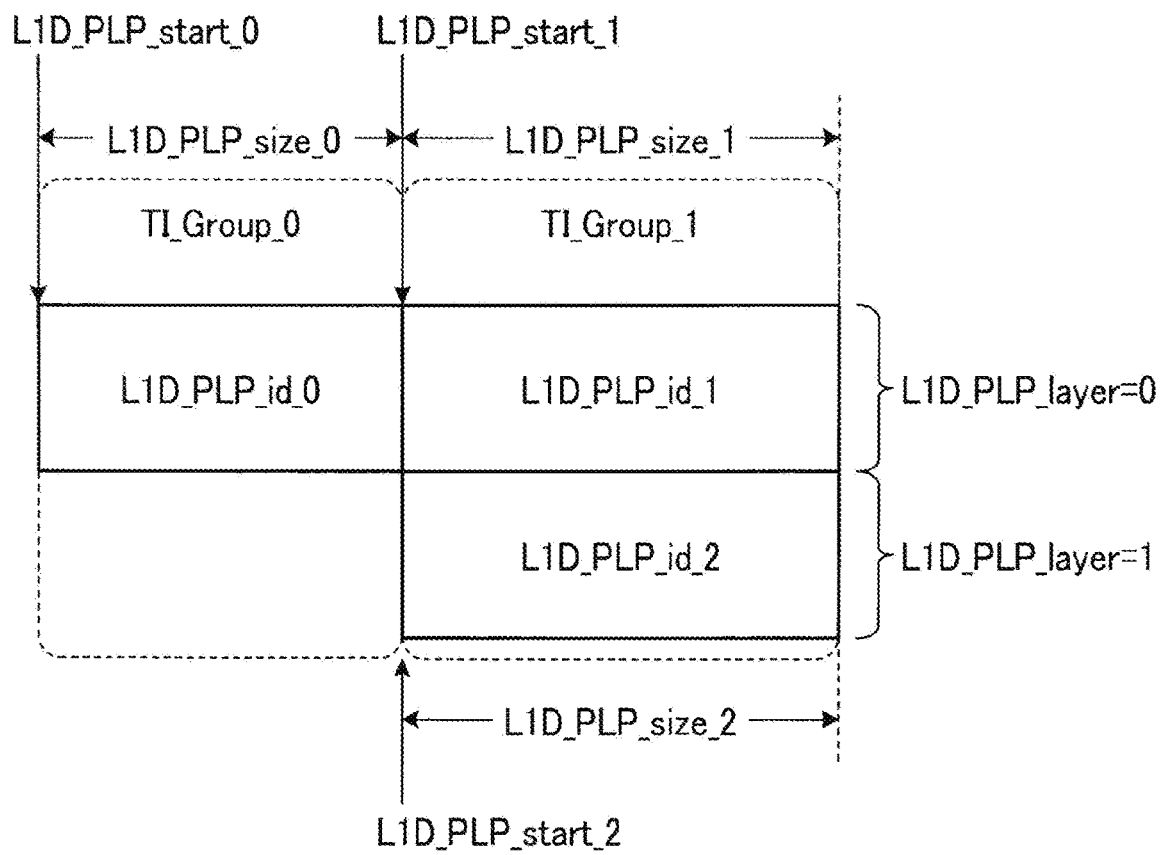
FIG. 14 is a diagram depicting an example of a layer structure multiplexed by LDM.

FIG. 14 is a diagram depicting an example of a layer structure multiplexed by LDM. More specifically, FIG. 14 is a diagram depicting an example of two PLPIDs of the core layer and one PLPID of the enhanced layer. According to the example in FIG. 14, L1D_PLP_id_0 and L1D_PLP_id_1 are each a PLPID of the core layer, while L1D_plp_id_2 is a PLPID of the enhanced layer. For example, it is assumed that L1D_plp_id_2 is associated with identification information. In this case, the system information interpretation unit 245b determines that the PLPID of the core layer corresponding to L1D_plp_id_2 is L1D_PLP_id_1, on the basis of information indicating start positions of respective PLPIDs (L1D_PLP_stat_0, L1D_PLP_stat_1, L1D_PLP_stat_2) and sizes of PLPIDs (L1D_PLP_size_0, L1D_PLP_size_1, L1D_PLP_size_2). Note that the start positions of the respective PLPIDs are determinable on the basis of L1D_plp_stat in a 46th row in Table 1-2. Moreover, the sizes of the respective PLPIDs are determinable on the basis of L1D_plp_size in a 47th row in Table 1-2.

Figure 15:
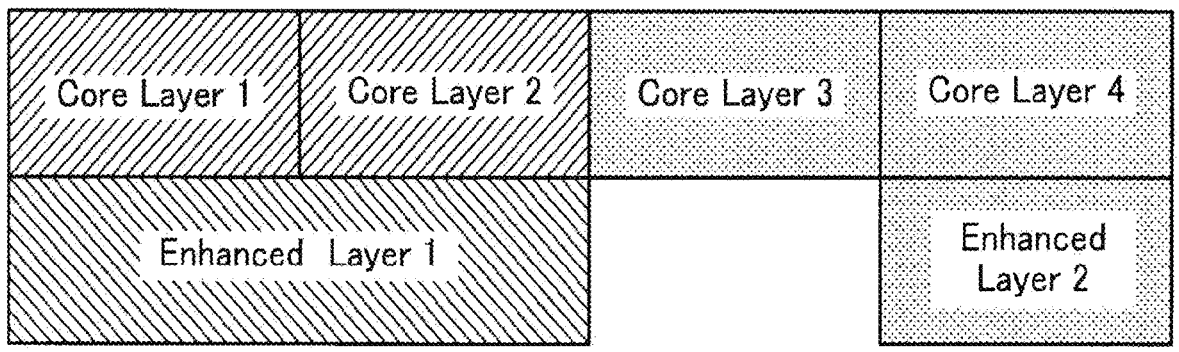
FIG. 15 is a diagram for explaining processing associated with interpretation of PLPIDs of core layers corresponding to PLPIDs of enhanced layers.
Figure 16:
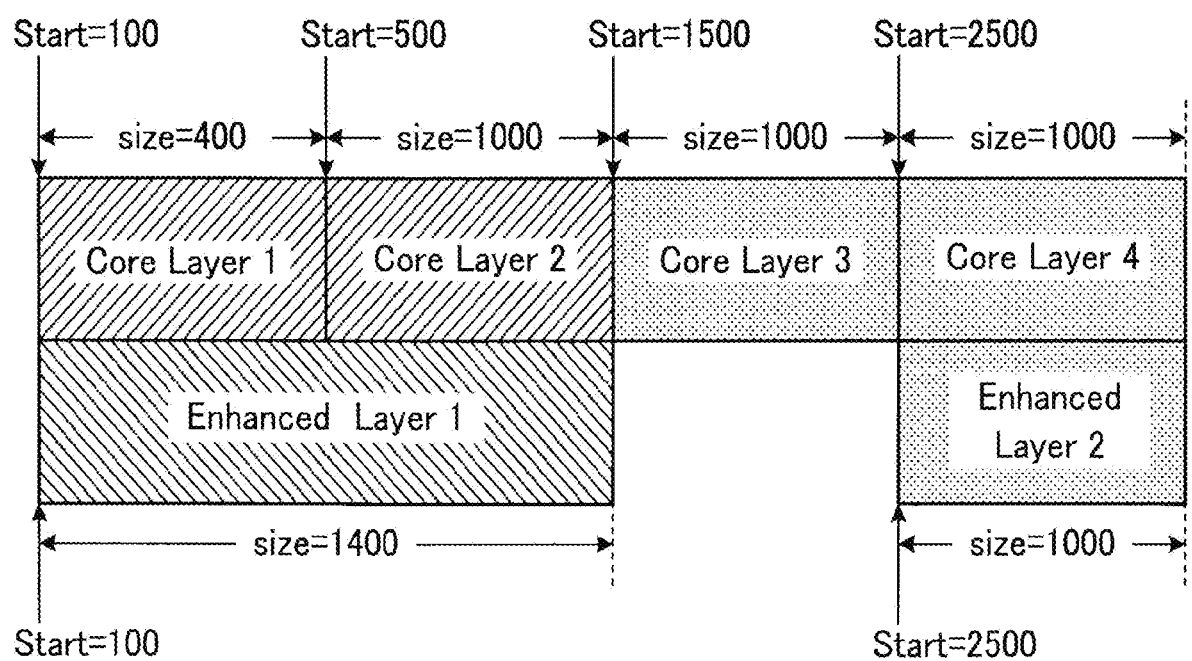
FIG. 16 is a diagram for explaining processing associated with interpretation of the PLPIDs of the core layers corresponding to the PLPIDs of the enhanced layers.

More detailed description will be presented with reference to a specific example. FIGS. 15 and 16 are diagrams for explaining processing associated with interpretation of a PLPID of the core layer corresponding to a PLPID of the enhanced layer. Considered herein will be a case where system information includes six PLPIDs as depicted in FIG. 15. Suppose that the reception device 20 desires to receive only a PLPID of Enhanced Layer 1 depicted in FIG. 15. In this case, the system information interpretation unit 245b is required to identify Core Layer 1 and Core Layer 2 to receive PLPID data of Enhanced Layer 1.

As described above, the start positions (L1D_plp_start) and the sizes (L1D_plp_size) of the respective PLPIDs are recorded in the system information (L1 information). Accordingly, the system information interpretation unit 245b acquires the start positions and the sizes of all the PLPIDs from the system information (L1 information). FIG. 16 presents the start positions and the sizes thus acquired.

The system information interpretation unit 245b picks up core layers having start values equal to or larger than a start value (Start=100) of Enhanced Layer 1. According to the example in FIG. 16, Core Layer 1 (Start=100), Core Layer 2 (Start=500), Core Layer 3 (Start=1500), and Core Layer 4 (Start=2500) are picked up.

The system information interpretation unit 245b arranges the picked-up core layers in an ascending order of the start value and obtains regions of the respective core layers from the sizes. Obtained in the example of FIG. 16 are a region of Core Layer 1 in a range of 100 to 499, a region of Core Layer 2 in a range of 500 to 1499, a region of Core Layer 3 in a range of 1500 to 2499, and a region of Core Layer 4 in a range of 2500 to 3499.

The system information interpretation unit 245b similarly obtains a region of Enhanced Layer 1. According to the example in FIG. 16, a region of Enhanced Layer 1 in a range of 100 to 1499 is obtained.

The system information interpretation unit 245b is capable of identifying the Core Layer corresponding to Enhanced Layer 1 by comparison between the region of Enhanced Layer 1 and the four regions of the core layers described above. According to the example in FIG. 16, Core Layer 1 (region=100 to 499) and Core Layer 2 (region=500 to 1499) are identified as the Core Layers corresponding to Enhanced Layer 1 (region=100 to 1499).

Note that the method described with reference to FIGS. 14 to 16 is presented only by way of example. The system information interpretation unit 245b may determine the PLPID of the core layer corresponding to the PLPID of the enhanced layer by using other methods.

Returning to FIG. 13, the decoding control unit 245c adds the PLPID of the core layer identified in step S105 as a PLPID to be decoded (step S106). Thereafter, the decoding control unit 245c executes processing until error correction (BCH decoder 242e4 depicted in FIG. 10) by controlling the decoding unit 242 (step S107). The decoding control unit 245c capable of obtaining a decoding result of the PLPID of the core layer corresponding to the PLPID of the enhanced layer (PLPID indicated by identification information) is also capable of decoding the PLPID of the enhanced layer.

In addition, in the case of decoding of the PLPID data of the enhanced layer, the PLPID data of the core layer is also output from the decoding unit 242. Accordingly, the output control unit 245d of the reception processing unit 24 filters the data of the core layers by controlling the selector 243 (step S108). Specifically, in a case where PLPID data identified by the identification information is PLPID data of the enhanced layer, the output control unit 245d controls the selector 243 in such a manner as to output only the PLPID of the enhanced layer to the postprocessing unit 22 (poststage processing unit) without outputting the PLPID data of the core layer to the postprocessing unit 22. In this manner, only the PLPID data corresponding to the identification information (PLPID) is output from the output interface 244.

After output of the PLPID data, the reception processing unit 24 ends the decoding process.

By the processing described above, the data of the core layer is not output from the reception processing unit 24 even if the data designated by the control unit 21 is data of the enhanced layer. In other words, data output from the reception processing unit 24 is only data associated with identification information (PLPID) designated by the control unit 21. Accordingly, a heavy processing load is not imposed on the postprocessing unit 22 located in a stage after the reception processing unit 24. As a result, the reception processing unit 24 can reduce power consumption of the reception device 20 by reduction of the processing load imposed on the reception device 20.

Moreover, the system information interpretation unit 245b interprets system information. Accordingly, the post-stage processing unit is capable of obtaining output without the necessity of determining which of PLP of the core layer and PLP of the enhanced layer is a service (PLP) desired by the user.

<3-2. 1-Step Decoding and 2-Step Decoding>

Note that the decoding process described above is a 2-step decoding process where the decoding unit 242 requires a decoding result of a core layer to decode an enhanced layer. However, the decoding unit 242 is capable of executing a 1-step decoding process not requiring a decoding result of a core layer to decode an enhanced layer. The 2-step decoding process (first decoding process) and the 1-step decoding process (second decoding process) will be hereinafter described with reference to FIGS. 17 and 18.

Figure 17:
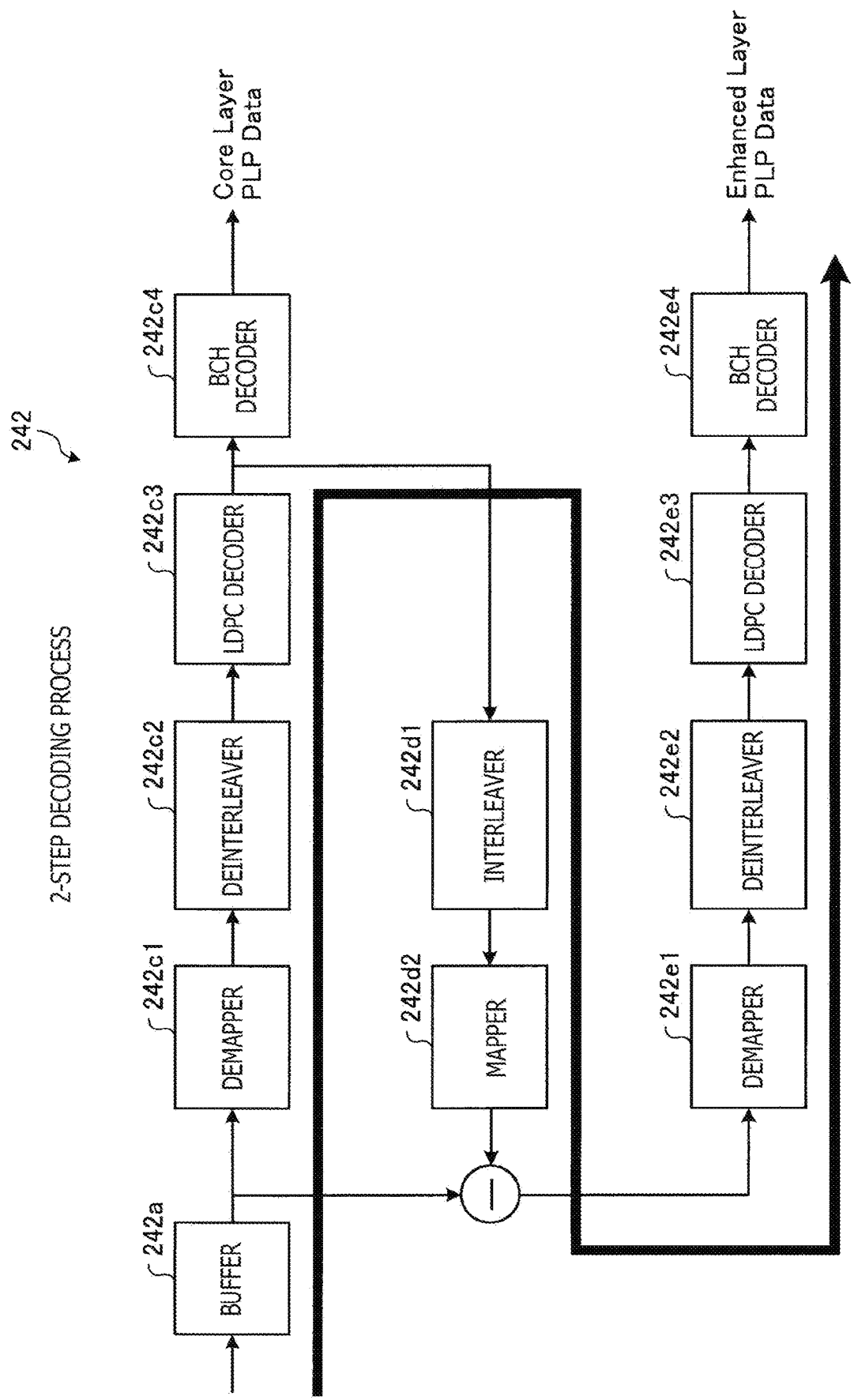
FIG. 17 is a diagram for explaining a 2-step decoding process.

FIG. 17 is a diagram for explaining the 2-step decoding process. The 2-step decoding process is a process which decodes a signal of a first layer (e.g., core layer), and then decodes a signal of a different layer (e.g., enhanced layer) on the basis of a result of the decoding of the first layer. Accordingly, the 2-step decoding process is a decoding process explained in the foregoing embodiment.

A thick line depicted in FIG. 17 indicates a flow of a process performed in the 2-step decoding process. In the 2-step decoding process, the decoding unit 242 decodes, on the basis of a decoding result obtained by the demapper 242c1 to the LDPC decoder 242c3, a signal of the core layer with use of the interleaver 242d1 to the mapper 242d2. Subsequently, the decoding unit 242 cancels the signal of the core layer restored from a reception signal buffered by the buffer 242a to restore a signal of the enhanced layer. Then, the decoding unit 242 decodes data of the enhanced layer with use of the demapper 242e1 to the BCH decoder 242c4. The 2-step decoding process is characterized by high noise immunity achieved by restoration of a signal of the enhanced layer required to decode data of the enhanced layer.

Figure 18:
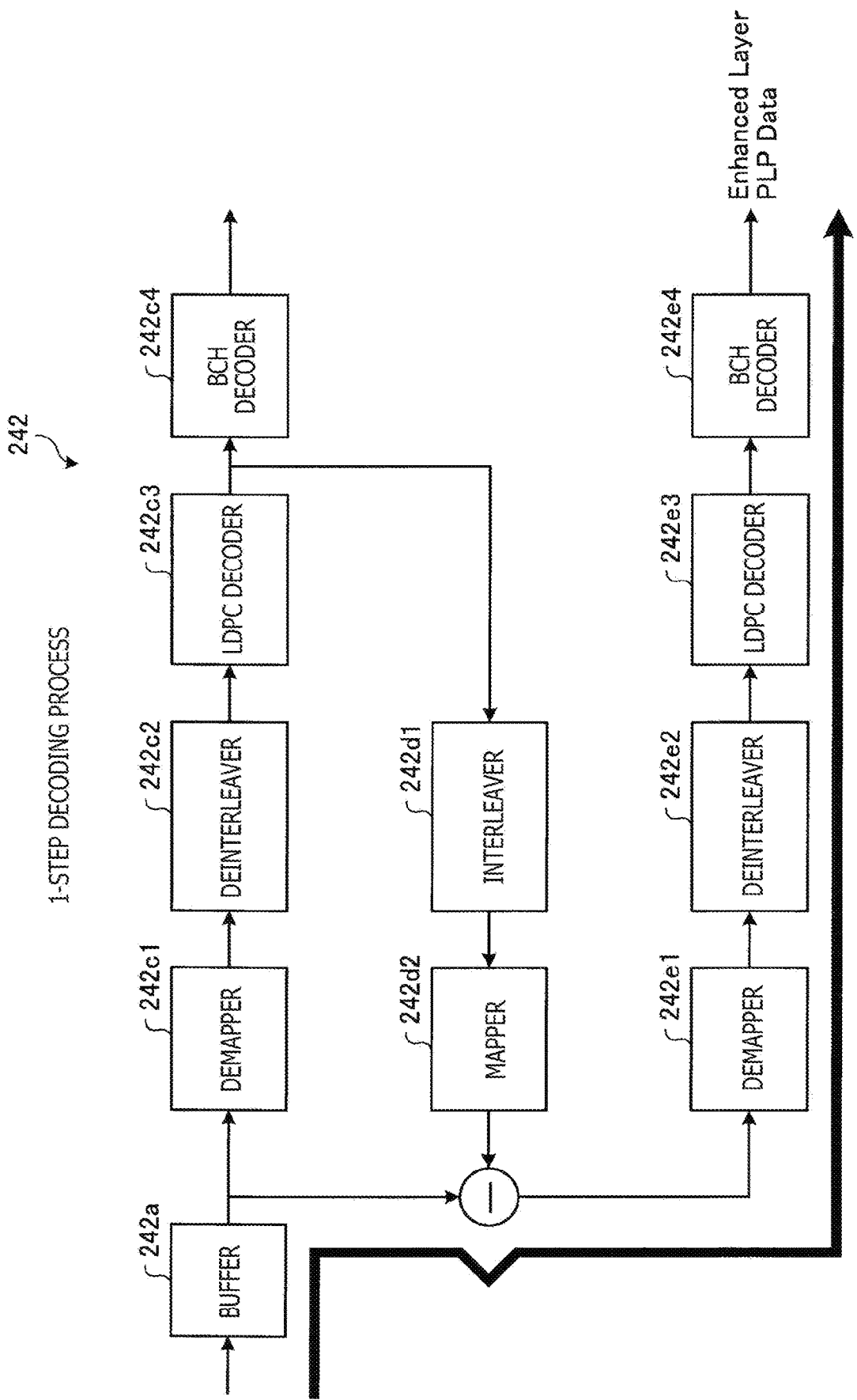
FIG. 18 is a diagram for explaining a 1-step decoding process.

FIG. 18 is a diagram for explaining the 1-step decoding process. The 1-step decoding process is a process which directly decodes a signal of the different layer (e.g., enhanced layer) without decoding a signal of the first layer (e.g., core layer). For example, the reception processing unit 24 recognizes a constellation (e.g., constellation D3 in FIG. 2) obtained by combining a constellation of the core layer (e.g., constellation D1 in FIG. 2) and a constellation of the enhanced layer (e.g., constellation D2 in FIG. 2). The decoding unit 242 directly decodes a signal of the enhanced layer without decoding a signal of the core layer by determining to which signal point of the synthesized constellation a reception signal corresponds.

In the following description, a constellation obtained by combining a constellation of the first layer (e.g., core layer) and a constellation of the different layer (e.g., enhanced layer) will be referred to a "combined constellation" in some cases.

A thick line depicted in FIG. 18 indicates a flow of a process performed in the 1-step decoding process. In the 1-step decoding process, the decoding unit 242 decodes data of the enhanced layer with use of the demapper 242e1 to the BCH decoder 242c4 without using the demapper 242c1 to the mapper 242d2. The 1-step decoding process is characterized by low power consumption achieved by eliminating processing using the demapper 242c1 to the mapper 242d2.

Note that the two decoding processes have a performance trade-off relation. Table 2 presented below is a table indicating a performance comparison between the 2-step decoding process and the 1-step decoding process.

TABLE 2

| Enhanced layer performance | 2-step decoding | 1-step decoding |
| --- | --- | --- |
| Power | High | Low |
| Noise immunity (error-correcting code correcting capability) | High (high correcting capability) | Low (low correcting capability) |

The 2-step decoding process requires a decoding process for decoding data of the core layer to perform a decoding process for decoding data of the enhanced layer. Accordingly, power consumption increases. However, the 2-step decoding process has high noise immunity. In other words, the 2-step decoding process has a high correcting capability for error correction.

On the other hand, the 1-step decoding process does not require a decoding process for decoding data of the core layer to perform a decoding process for decoding data of the enhanced layer. Accordingly, a processing load decreases. In other words, power consumption decreases. However, the 1-step decoding process has low noise immunity. In other words, the 1-step decoding process has a low correcting capability for error correction.

However, noise immunity at a level comparable to the 2-step decoding process is achievable even by the 1-step decoding process in some cases. By using the 1-step decoding process in such cases, both high noise immunity and low power consumption (light processing load) are achievable.

Accordingly, in the decoding process of the present embodiment, the reception processing unit 24 selects, from a plurality of decoding processes, a decoding process used by the decoding unit 242 in a case where data identified by identification information is data obtained by decoding a signal of the enhanced layer (different layer). For example, the reception processing unit 24 selects, on the basis of information associated with a reception signal, either the 2-step decoding process (first decoding process) or the 1-step decoding process (second decoding process) as a decoding process used by the decoding unit 242. For example, the "information associated with the reception signal" herein is respective modulation methods of the core layer and the enhanced layer and a power ratio of the core layer to the enhanced layer. The power ratio can also be referred to as an injection level.

In this manner, the reception device 20 of the present embodiment can achieve both high noise immunity and low power consumption (light processing load).

<3-3. Another Example of Decoding Process>

Figure 19:
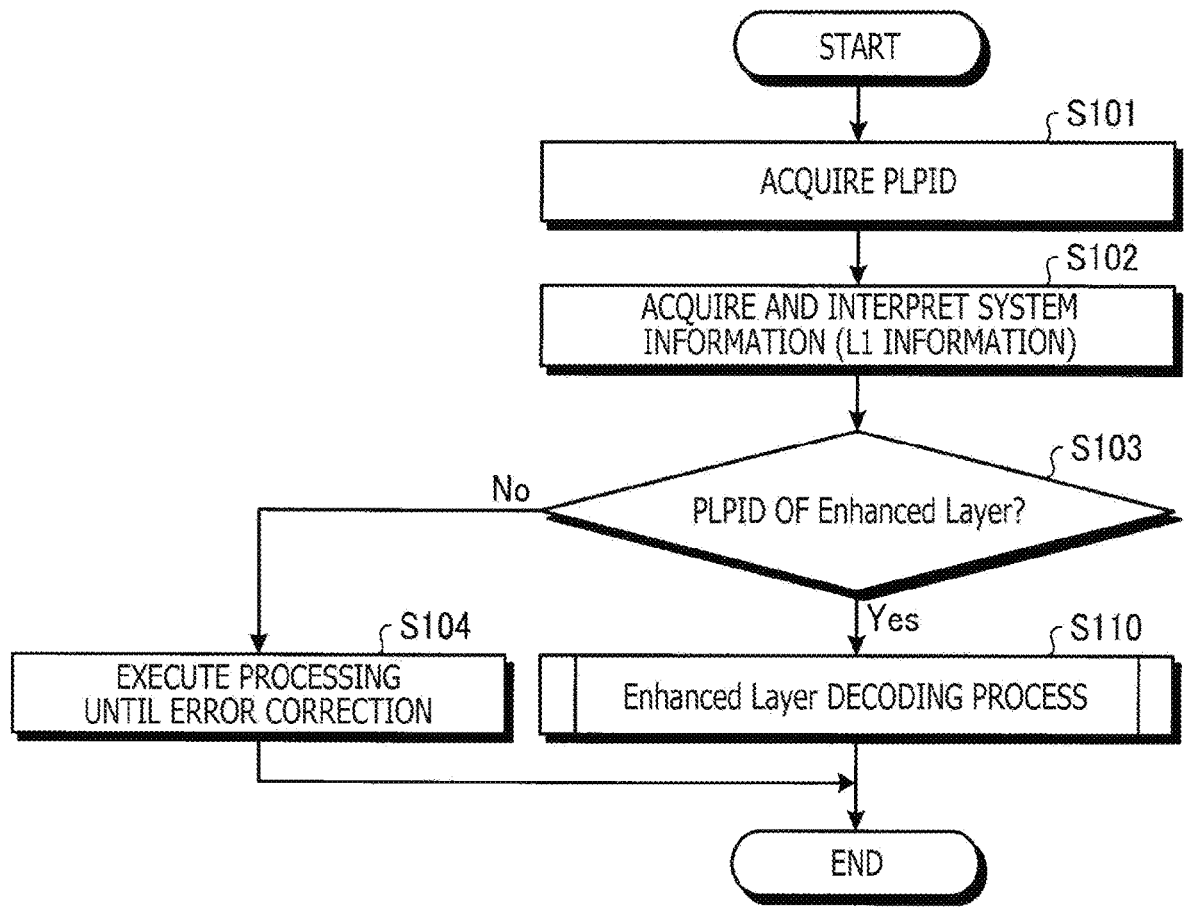
FIG. 19 is a flowchart presenting another example of the decoding process according to the embodiment of the present disclosure.

Another example of the decoding process will be described in consideration of the above. FIG. 19 is a flowchart presenting the other example of the decoding process according to the embodiment of the present disclosure. The decoding process described below is executed by the reception processing unit 24 of the reception device 20, for example. More specifically, the decoding process is executed by the system information processing unit 245 of the reception processing unit 24. The other example of the decoding process will be hereinafter described with reference to FIG. 19.

Note that the decoding process described below is a process on an assumption that the transfer system 1 is an ATSC 3.0 transfer system. However, needless to say, the decoding process of the present embodiment is not limited to the process described below. The process described below may be modified as appropriate in accordance with standards or the like to be adopted. For example, in a case where the transfer system 1 a transfer system in conformity with a standard other than ATSC 3.0, such as ISDB or NR, terms such as "system information (L1 information)," a "core layer," an "enhanced layer," and a "PLPID" are replaced with corresponding terms as appropriate.

First, the acquisition unit 245a of the reception processing unit 24 acquires, from the control unit 21, identification information indicating data associated with an output request (i.e., PLPID desired to be received by the reception device 20) (step S101).

Subsequently, the system information interpretation unit 245b of the reception processing unit 24 acquires and interprets system information (L1 information) (step S102).

Subsequently, the decoding control unit 245c of the reception processing unit 24 determines, on the basis of an interpretation result of the system information, whether the identification information (PLPID) acquired in step S101 is a PLPID of the enhanced layer (step S103).

In a case where the identification information acquired in step S101 is not a PLPID of the enhanced layer, i.e., in a case where the identification information acquired in step S101 is a PLPID of the core layer (step S103: No), the decoding control unit 245c executes processing until error correction (BCH decoder 242c4 depicted in FIG. 10) by controlling the decoding unit 242 (step S104). In this manner, only PLPID data (data of the core layer) designated by the identification information is output from the reception processing unit 24. After output of the PLPID data, the reception processing unit 24 ends the decoding process.

Figure 20:
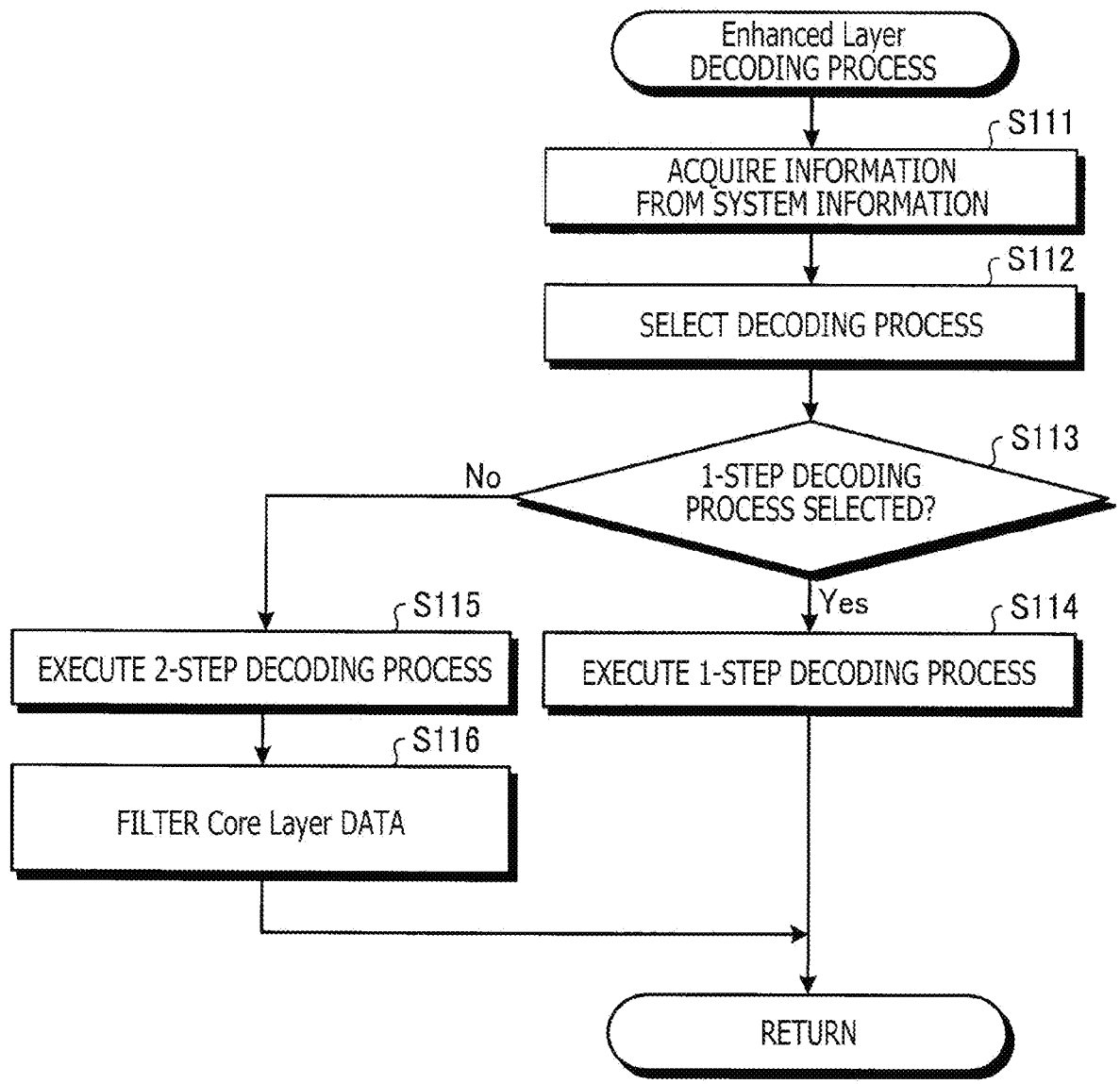
FIG. 20 is a flowchart presenting an Enhanced layer decoding process according to the embodiment of the present disclosure.

On the other hand, in a case where the identification information acquired in step S101 is a PLPID of the enhanced layer (step S103: Yes), the system information processing unit 245 executes an Enhanced Layer decoding process (step S110). FIG. 20 is a flowchart presenting the Enhanced Layer decoding process according to the embodiment of the present disclosure. The Enhanced Layer decoding process will be hereinafter described with reference to FIG. 20.

First, the system information interpretation unit 245b acquires "information associated with a reception signal" from system information (L1 information) (step S111). The "information associated with the reception signal" may be acquired by the acquisition unit 245a of the reception processing unit 24. For example, the "information associated with the reception signal" herein is respective modulation methods of the core layer and the enhanced layer and a power ratio of the core layer to the enhanced layer.

For example, if the transfer system 1 is an ATSC 3.0 transfer system, information indicating the modulation method is L1D_plp_mod included in the system information (L1 information). L1D_plp_mod is indicated in a row number 51 in Table 1-2. Moreover, if the transfer system 1 is an ATSC 3.0 transfer system, information indicating the power ratio is L1D_plp_ldm_injection_Level included in the system information (L1 information). L1D_plp_ldm_injection_level is indicated in a row number 101 in Table 1-3. Note that L1D_plp_ldm_injection_level is defined in a case of L1D_plp_layer>0. In other words, L1D_plp_ldm_injection_level is information included in only the enhanced layer.

Subsequently, the selection unit 245e of the reception processing unit 24 selects, from a plurality of decoding processes, a decoding process used by the decoding unit 242 (step S112). For example, the reception processing unit 24 selects, on the basis of information associated with the reception signal, either the 2-step decoding process (first decoding process) or the 1-step decoding process (second decoding process) as a decoding process used by the decoding unit 242.

[Selection Method 1: Selection by Modulation Method]

For example, the selection unit 245e may select, on the basis of information indicating a modulation method, either the 2-step decoding process or the 1-step decoding process as a decoding process used by the decoding unit 242.

In a case of use of the 1-step decoding process, all signal points of a combined constellation (e.g., constellation D3 in FIG. 2) are interpreted without change. Accordingly, the number of all signal points calculated by the respective modulation methods of the core layer and the enhanced layer is a point to note. Noise immunity increases as the number of all signal points decreases. Noise immunity decreases as the number of all signal points increases.

Figure 21:
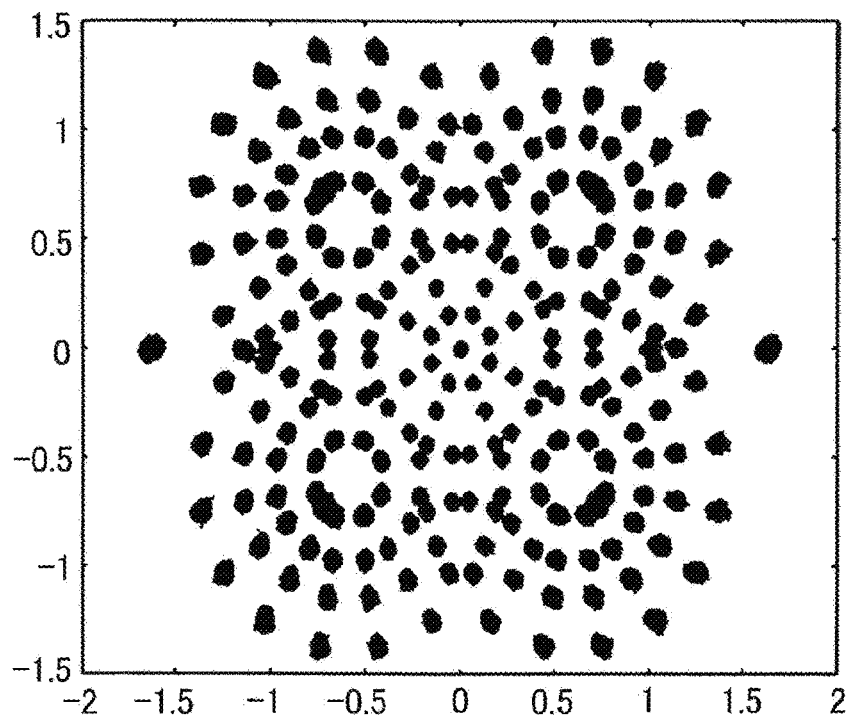
FIG. 21 is a diagram for explaining the number of signal points of a combined constellation.
Figure 22:
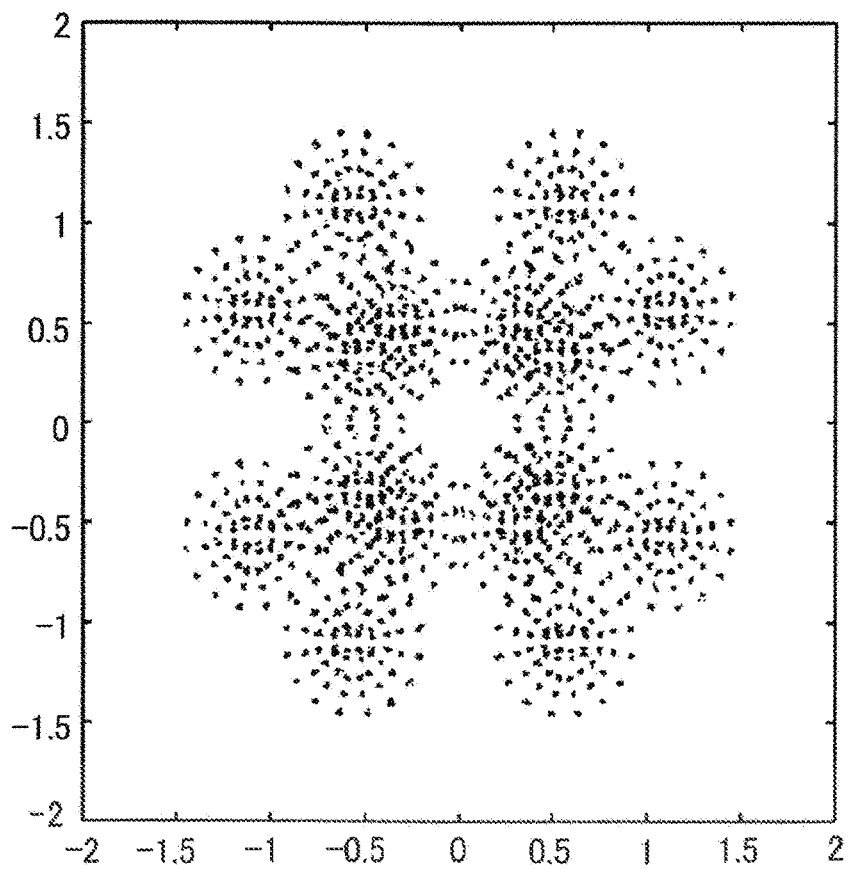
FIG. 22 is a diagram for explaining the number of signal points of a combined constellation.

FIGS. 21 and 22 each depict a diagram for explaining the number of signal points of a combined constellation. FIG. 21 depicts a constellation in a case of use of QPSK for the modulation method of the core layer and 64 QAM for the modulation method of the enhanced layer. In the example of FIG. 21, the number of signal points of the constellation is 256. On the other hand, FIG. 22 depicts a constellation in a case of use of 64 QAM for the modulation method of the core layer and 64 QAM for the modulation method of the enhanced layer. In the example of FIG. 22, the number of signal points of the constellation is 1024. As apparent from a comparison between FIGS. 21 and 22, the intervals between the signal points on the constellation decreases as the number of signal points increases, so that it is difficult to recognize at which signal point a reception signal is located. Accordingly, in the case of a large number of signal points, noise immunity in the case of use of the 1-step decoding process is considerably inferior to noise immunity in the case of use of the 1-step decoding process.

Accordingly, the selection unit 245e selects the 2-step decoding process (first decoding process) as a decoding process used by the decoding unit 242 in a case where the number of signal points of the combined constellation identified by information indicating the modulation method is larger than a predetermined threshold, and selects the 1-step decoding process (second decoding process) as a decoding process used by the decoding unit 242 in a case where the number of signal points of the combined constellation is smaller than the predetermined threshold. For example, 1024 is assumed as the predetermined threshold. Needless to say, the predetermined threshold is not limited to 1024.

[Selection Method 2: Selection by Power Ratio]

Moreover, the selection unit 245e may select, on the basis of information indicating a power ratio, either the 2-step decoding process or the 1-step decoding process as a decoding process used by the decoding unit 242.

FIG. 23 is a diagram depicting a constellation change produced by a power ratio (injection level) difference during enhanced layer multiplexing. Each of four constellations R1 to R4 depicted in FIG. 23 is obtained using 16 QAM for the modulation method of the core layer and 64 QAM for the modulation method of the enhanced layer. The power ratio decreases with nearness to the right side (constellation R4 side) of the figure. In other words, the power level of the enhanced layer approaches the power level of the core layer with nearness to the right side of the figure.

As can be seen from FIG. 23, an overlap gradually appears in the constellation of the enhanced layer as the power ratio decreases. In more detailed description, a region occupied by a signal point group included in the enhanced layer and superimposed at a predetermined signal point of the core layer in the constellation, and a region occupied by a signal point group included in the enhanced layer and superimposed at a different signal point of the core layer in the constellation come to overlap with each other as the power ratio decreases.

The region occupied by the signal point group of the enhanced layer in the constellation decreases at a large power ratio. Accordingly, an overlap between the regions disappears. On the other hand, the region occupied by the signal point group of the enhanced layer in the constellation increases at a small power ratio. Accordingly, an overlap between the regions is produced. In the case of use of the 1-step decoding process, noise immunity increases more when this overlap between the regions is absent. The absence of the overlap increases noise immunity for the following reason. In a case of presence of the overlap between the regions, it may become difficult to determine which region includes a signal point corresponding to a received signal of the enhanced layer.

In the following description, a set of a plurality of signal points of the enhanced layer (different layer) superimposed on an identical signal point of the core layer (first layer) will be simply referred to as a "signal point group of the enhanced layer (different layer)" in some cases. For example, the "region occupied by the signal point group of the enhanced layer (different layer) in the constellation" herein refers to each of the regions surrounded by the broken circles representing the constellation D3 and the constellation D4 in the example of FIG. 2.

Accordingly, the selection unit 245e selects the 2-step decoding process (first decoding process) as a decoding process used by the decoding unit 242 in a case where the power ratio is smaller than a predetermined threshold, and selects the 1-step decoding process (second decoding process) as a decoding process used by the decoding unit 242 in a case where the power ratio is larger than the predetermined threshold.

In this case, the selection unit 245e may determine whether or not an overlap is present between the regions occupied by the signal point groups of the enhanced layer (different layer) in the constellation, on the basis of information indicating the power ratio, on the basis of information indicating the modulation method and information indicating the power ratio. The selection unit 245e may select the 2-step decoding process (first decoding process) as the decoding process used by the decoding unit 242 in a case where at least one overlap is present, or select the 1-step decoding process (second decoding process) as the decoding process used by the decoding unit 242 in a case where no overlap is present. In this manner, noise immunity and power can be well-balanced.

[Selection Method 3: Selection by Modulation Method and Power Ratio]

Moreover, the selection unit 245e may select, on the basis of information indicating a modulation method and information indicating a power ratio, either the 2-step decoding process or the 1-step decoding process as a decoding process used by the decoding unit 242.

In this case, the selection unit 245e may determine, on the basis of information indicating the modulation method and information indicating the power ratio, whether or not an overlap is present between the regions occupied by the signal point groups of the enhanced layer (different layer) in the constellation. The selection unit 245e may select the 2-step decoding process (first decoding process) as the decoding process used by the decoding unit 242 in a case where at least one overlap is present, or select the 1-step decoding process (first decoding process) as the decoding process used by the decoding unit 242 in a case where no overlap is present.

Noise immunity and power can be balanced more accurately by combining information indicating the modulation method and information indicating power ratio.

Returning to FIG. 20, the decoding control unit 245c of the reception processing unit 24 determines whether the decoding method selected in step S112 is the 1-step decoding process (step S113).

In a case where the decoding method selected in step S112 is the 1-step decoding process (step S113: Yes), the decoding control unit 245c executes the 1-step decoding process by controlling the decoding unit 242 (step S114). In this case, only PLPID data (data of enhanced layer) designated by identification information is output without output of PLPID data of the core layer. Accordingly, after the PLPID data is output, the reception processing unit 24 ends the decoding process without executing filing of the output data.

On the other hand, in a case where the decoding method selected in step S112 is the 2-step decoding process (step S113: No), the decoding control unit 245c executes the 2-step decoding process by controlling the decoding unit 242 (step S115). The 2-step decoding process may be similar to the process presented in steps 105 to S107 described above.

In addition, in the case of the 2-step decoding process, PLPID data of the core layer is also output from the decoding unit 242. Therefore, the output control unit 245d of the reception processing unit 24 filters the data of the core layer by controlling the selector 243 (step S116). Specifically, the output control unit 245d controls the selector 243 in such a manner as to output only the PLPID of the enhanced layer to the postprocessing unit 22 (post-stage processing unit) without outputting the PLPID data of the core layer to the postprocessing unit 22. In this manner, only the PLPID data corresponding to the identification information (PLPID) is output from the output interface 244.

After output of the PLPID data, the reception processing unit 24 ends the decoding process.

By the above processing, the reception device 20 achieves both high noise immunity and low power consumption (light processing load).

<<4. Modifications>>

The embodiment described above is presented only by way of example, and therefore, various modifications and applications may be made.

<4-1. Modifications Relating to Transfer System>

For example, it is assumed in the above embodiment that the transfer system 1 is a broadcasting system in conformity with ATSC 3.0. However, the present embodiment is also applicable to other transfer systems allowed to use LDM (the transmission device 10 and the reception device 20).

Moreover, while the transmission device 10 and the reception device 20 are devices allowed to use LDM in the embodiment described above, the transmission device 10 and the reception device 20 may use other multiplexing technologies for multiplexing and transmitting signals in a non-orthogonal axis (e.g., power axis) direction. The non-orthogonal axis is an axis not orthogonal to a frequency axis and a time axis which are orthogonal axes. For example, the transmission device 10 and the reception device 20 may use NOMA (Non-orthogonal Multiple Access) as one of other multiplexing technologies. The present embodiment is applicable to multiplexing technologies other than LDM.

Note that the non-orthogonal axis is not limited to a power axis (Power axis), but may be any one of an Interleave Pattern axis, a Spreading Pattern axis, a Scrambling Pattern axis, and a Codebook axis, for example.

Moreover, while data output from the reception processing unit 24 is an ALP packet in the embodiment described above, data output from the reception processing unit 24 may be data in other formats.

Further, while QPSK as the modulation method of the core layer (first layer), and QAM (e.g., 16 QAM, 64 QAM, 256 QAM) as the modulation method of the enhanced layer (different layer) are presented in the embodiment described above by way of example, the modulation methods are not limited to these methods. Known various modulation methods may be adopted for each of the modulation methods of the core layer (first layer) and the enhanced layer (different layer). For example, the modulation method of the core layer (first layer) may be other types of PSK (Phase-Shift Keying) such as BPSK (Binary Phase-Shift Keying) and 8 PSK (8 Phase-Shift Keying), or may be QAM. On the other hand, the modulation method of the enhanced layer (different layer) may be other types of QAM such as 32 QAM and 128 QAM, or may be PSK.

Note that the constellations described in the above embodiment are presented only by way of example. The numbers and positions of the signal points on the constellations are not limited to the numbers and the positions presented in the embodiment described above. In this case, the constellations may be non-uniform constellations (NUCs), or may be constellations other than non-uniform constellations.

<4-2. Other Modifications>

The controller controlling the transmission device 10 or the reception device 20 of the present embodiment may be implemented by either a dedicated computer system, or a general-purpose computer system.

For example, a program for executing the above operations is stored in a computer-readable recording medium, such as an optical disk, a semiconductor memory, a magnetic tape, or a flexible disk, and distributed in this form. Thereafter, the program is installed in a computer, for example. The processes described above are executed under the program to constitute a controller. In this case, the controller may be a device outside the transmission device 10 or the reception device 20 (e.g., personal computer). Alternatively, the controller may be a device inside the transmission device 10 or the reception device 20 (e.g., the control unit 11, the transmission processing unit 14, the control unit 21, or the reception processing unit 24).

Further, the communication program described above may be stored in a disk device included in a server device on a network such as the Internet, and downloaded to a computer, for example. In addition, the functions described above may be achieved in cooperation with an OS (Operating System) and application software. In this case, a portion other than the OS may be stored in a medium and distributed in this form, or may be stored in a server device and downloaded to a computer, for example.

Besides, all or some of processes included in the respective processes of the above embodiment and described as automatically performed processes may be manually performed, or all or some of processes described as manually performed processes may be automatically performed by using a known method. Moreover, information including processing procedures, specific names, various types of data and parameters presented in the above document and the drawings may be changed in any manners unless otherwise specified. For example, various types of information presented in the respective figures is not limited to the information included in the figures.

Further, the respective constituent elements of the respective devices depicted in the figures are functional concepts and are not necessarily required to be physically configured in the manner depicted in the figures. Specifically, specific modes of distribution and integration of the respective devices are not limited to those depicted in the figures, and all or some thereof may be configured while functionally or physically distributed or integrated in any units according to various loads and use states.

In addition, respective processing contents of the embodiment described above may be appropriately combined within a range where no inconsistency is produced. Besides, the order of the respective steps presented in the flowcharts in the present embodiment may be changed as appropriate.

<<5. Summary>>

As described above, according to one embodiment of the present disclosure, the reception processing unit 24 acquires identification information associated with data obtained by decoding a reception signal which includes a signal included in a core layer and a signal included in an enhanced layer and multiplexed on the signal of the core layer, as data output to the postprocessing unit 22. Subsequently, the reception processing unit 24 decodes the signal of the core layer, and then decodes the signal of the enhanced layer on the basis of a result of the decoding. Thereafter, in a case where data identified by the identification information is data obtained by decoding the signal of the enhanced layer, the reception processing unit 24 outputs the data obtained by decoding the signal of the enhanced layer to the postprocessing unit 22 without outputting data obtained by decoding the signal of the core layer to the postprocessing unit 22.

In this manner, a heavy processing load is not imposed on at least data processing after the processing of the reception signal by the reception processing unit 24. Accordingly, the reception processing unit 24 can reduce the processing load of the reception device 20. As a result, the reception processing unit 24 can reduce power consumption of the reception device 20.

While the respective embodiments of the present disclosure have been described above, the technical scope of the present disclosure is not strictly limited to the respective embodiments described above. Various modifications may be made without departing from the gist of the present disclosure. Moreover, constituent elements of different embodiments and modifications may be combined as appropriate.

Further, advantageous effects produced by the respective embodiments described in the present description are presented only by way of example, and other advantageous effects may be produced.

Note that the present technology can also have following configurations.

(1)

A signal processing device including:
  an acquisition unit that acquires identification information associated with data obtained by decoding a reception signal that includes a signal included in a first layer and a signal included in a different layer and superimposed on the signal of the first layer in a power axis direction, the data being output to a post-stage processing unit;
  a decoding unit that decodes the signal of the different layer on the basis of a result of decoding of the signal of the first layer after the decoding of the signal of the first layer; and
  an output control unit that outputs data obtained by decoding the signal of the different layer to the post-stage processing unit without outputting data obtained by decoding the signal of the first layer to the post-stage processing unit, in a case where data identified by the identification information is data obtained by decoding the signal of the different layer.

(2)

The signal processing device according to (1) described above, further including:
  a selection unit that selects, from a plurality of decoding processes, a decoding process used by the decoding unit, in a case where the data identified by the identification information is the data obtained by decoding the signal of the different layer, in which the decoding unit decodes the signal of the different layer with use of the decoding process selected by the selection unit.

(3)
The signal processing device according to (2) described above, in which
the decoding unit is able to execute a first decoding process that decodes the signal of the different layer on the basis of the result of the decoding of the signal of the first layer after the decoding of the signal of the first layer, and a second decoding process that directly decodes the signal of the different layer without decoding the signal of the first layer, and
the selection unit selects, on the basis of information associated with the reception signal, either the first decoding process or the second decoding process as the decoding process used by the decoding unit, in a case where the data identified by the identification information is the data obtained by decoding the signal of the different layer.

(4)
The signal processing device according to (3) described above, in which
the information associated with the reception signal includes information indicating respective modulation methods of the signal of the first layer and the signal of the different layer, and
the selection unit selects, on the basis of the information indicating the modulation methods, either the first decoding process or the second decoding process as the decoding process used by the decoding unit, in a case where the data identified by the identification information is the data obtained by decoding the signal of the different layer.

(5)
The signal processing device according to (4) described above, in which, in a case where the data identified by the identification information is the data obtained by decoding the signal of the different layer, the selection unit selects the first decoding process as the decoding process used by the decoding unit in a case where the number of signal points of a constellation specified by the information indicating the modulation methods is larger than a predetermined threshold, and selects the second decoding process as the decoding process used by the decoding unit in a case where the number of the signal points of the constellation is smaller than the predetermined threshold.

(6)
The signal processing device according to (3) described above, in which
the information associated with the reception signal includes information indicating a power ratio of the signal of the first layer to the signal of the different layer, and
the selection unit selects, on the basis of the information indicating the power ratio, either the first decoding process or the second decoding process as the decoding process used by the decoding unit, in a case where the data identified by the identification information is the data obtained by decoding the signal of the different layer.

(7)
The signal processing device according to (6) described above, in which, in a case where the data identified by the identification information is the data obtained by decoding the signal of the different layer, the selection unit selects the first decoding process as the decoding process used by the decoding unit in a case where the power ratio is smaller than a predetermined threshold, and selects the second decoding process as the decoding process used by the decoding unit in a case where the power ratio is larger than the predetermined threshold.

(8)
The signal processing device according to (3) described above, in which
the information associated with the reception signal includes information indicating respective modulation methods of the signal of the first layer and the signal of the different layer and includes information indicating a power ratio of the signal of the first layer to the signal of the different layer, and
the selection unit selects, on the basis of the information indicating the modulation methods and the information indicating the power ratio, either the first decoding process or the second decoding process as the decoding process used by the decoding unit, in a case where the data identified by the identification information is the data obtained by decoding the signal of the different layer.

(9)
The signal processing device according to (8) described above, in which, in a case where the data identified by the identification information is the data obtained by decoding the signal of the different layer, the selection unit determines, on the basis of the information indicating the modulation methods and the information indicating the power ratio, whether or not an overlap is present in a constellation between regions occupied by signal point groups each of which is a set of a plurality of signal points included in the different layer and superimposed at an identical signal point of the first layer, and selects the first decoding process as the decoding process used by the decoding unit in a case of presence of the overlap and selects the second decoding process as the decoding process used by the decoding unit in a case of absence of the overlap.

(10)
The signal processing device according to any one of (1) to (9) described above, in which the reception signal is a signal generated by an LDM (Layered Division Multiplexing) method.

(11)
The signal processing device according to (10) described above, in which the signal of the first layer and the signal of the different layer are signals of stream data for broadcasting.

(12)
The signal processing device according to any one of (1) to (11) described above, in which
the signal processing device is a processor, and the post-stage processing unit is another processor that processes data output from the processor.

(13)
A reception device including:
a reception processing unit that outputs, to a post-stage processing unit, data obtained by decoding a reception signal that includes a signal included in a first layer and a signal included in a different layer and superimposed on the signal of the first layer in a power axis direction, in which
the reception processing unit includes an acquisition unit that acquires identification information associated with the data output to the post-stage processing unit, a decoding unit that decodes the signal of the different layer on the basis of a result of decoding of the signal of the first layer after the decoding of the signal of the first layer, and an output control unit that outputs data obtained by decoding the signal of the different layer to the post-stage processing unit without outputting data obtained by decoding the signal of the first layer to the post-stage processing unit, in a case where data identified by the identification information is data obtained by decoding the signal of the different layer.

(14)

A signal processing method including:

acquiring identification information associated with data obtained by decoding a reception signal that includes a signal included in a first layer and a signal included in a different layer and superimposed on the signal of the first layer in a power axis direction, the data being output to a post-stage processing unit;

decoding the signal of the different layer on the basis of a result of decoding of the signal of the first layer after the decoding of the signal of the first layer; and outputting data obtained by decoding the signal of the different layer to the post-stage processing unit without outputting data obtained by decoding the signal of the first layer to the post-stage processing unit, in a case where data identified by the identification information is data obtained by decoding the signal of the different layer.

(15)

A signal processing program for causing a computer to function as:

an acquisition unit that acquires identification information associated with data obtained by decoding a reception signal that includes a signal included in a first layer and a signal included in a different layer and superimposed on the signal of the first layer in a power axis direction, the data being output to a post-stage processing unit;

a decoding unit that decodes the signal of the different layer on the basis of a result of decoding of the signal of the first layer after the decoding of the signal of the first layer; and an output control unit that outputs data obtained by decoding the signal of the different layer to the post-stage processing unit without outputting data obtained by decoding the signal of the first layer to the post-stage processing unit, in a case where data identified by the identification information is data obtained by decoding the signal of the different layer.

REFERENCE SIGNS LIST

1: Transfer system
10: Transmission device
20: Reception device
11, 21: Control unit
12, 23: Input/output unit
13: Preprocessing unit
14: Transmission processing unit
22: Postprocessing unit
24: Reception processing unit
241: OFDM demodulation unit
242: Decoding unit
242a: Buffer
242c1, 242e1: Demapper
242c2, 242e2: Deinterleaver
242c3, 242e3: LDPC decoder
242c4, 242e4: BCH decoder
242d1: Interleaver
242d2: Mapper
243: Selector
244: Output interface
245: System information processing unit
245a: Acquisition unit
245b: System information interpretation unit
245c: Decoding control unit
245d: Output control unit
245e: Selection unit

The invention claimed is:

1. A signal processing device, comprising:
circuitry configured to:
acquire identification information associated with data obtained by decoding a reception signal that includes a signal included in a first layer and a signal included in a different layer and superimposed on the signal of the first layer in a power axis direction, the data being output to a post-stage processing unit;

execute a first decoding process that decodes the signal of the different layer based on a result of decoding of the signal of the first layer after the decoding of the signal of the first layer, and a second decoding process that directly decodes the signal of the different layer without decoding the signal of the first layer;

select, based on information associated with the reception signal, either the first decoding process or the second decoding process as a decoding process, based on a determination that the data identified by the identification information is the data obtained by decoding the signal of the different layer;

decode the signal of the different layer based on the selected decoding process and the result of the decoding of the signal of the first layer after the decoding of the signal of the first layer; and output data obtained by decoding the signal of the different layer to the post-stage processing unit without outputting data obtained by decoding the signal of the first layer to the post-stage processing unit, based on the determination that data identified by the identification information is data obtained by decoding the signal of the different layer.

2. The signal processing device according to claim 1, wherein
the information associated with the reception signal includes information indicating respective modulation methods of the signal of the first layer and the signal of the different layer, and
the circuitry is further configured to select, based on the information indicating the modulation methods, either the first decoding process or the second decoding process as the decoding process, when the data identified by the identification information is the data obtained by decoding the signal of the different layer.

3. The signal processing device according to claim 2, wherein, based on a determination that the data identified by the identification information is the data obtained by decoding the signal of the different layer, the circuitry is further configured to:
select the first decoding process as the decoding process when a number of signal points of a constellation specified by the information indicating the modulation methods is larger than a specific threshold; and select the second decoding process as the decoding process when the number of the signal points of the constellation is smaller than the specific threshold.

4. The signal processing device according to claim 1, wherein the information associated with the reception signal includes information indicating a power ratio of the signal of the first layer to the signal of the different layer, and the circuitry is further configured to select, based on the information indicating the power ratio, either the first decoding process or the second decoding process as the decoding process, when the data identified by the identification information is the data obtained by decoding the signal of the different layer.

5. The signal processing device according to claim 4, wherein, based on a determination that the data identified by the identification information is the data obtained by decoding the signal of the different layer, the circuitry is further configured to:

select the first decoding process as the decoding process when the power ratio is smaller than a specific threshold; and select the second decoding process as the decoding process when the power ratio is larger than the specific threshold.

6. The signal processing device according to claim 1, wherein the information associated with the reception signal includes information indicating respective modulation methods of the signal of the first layer and the signal of the different layer and includes information indicating a power ratio of the signal of the first layer to the signal of the different layer, and the circuitry is further configured to select, based on the information indicating the modulation methods and the information indicating the power ratio, either the first decoding process or the second decoding process as the decoding process, when the data identified by the identification information is the data obtained by decoding the signal of the different layer.

7. The signal processing device according to claim 6, wherein, when the data identified by the identification information is the data obtained by decoding the signal of the different layer, the circuitry is further configured to:

determine, based on the information indicating the modulation methods and the information indicating the power ratio, whether an overlap is present in a constellation between regions occupied by signal point groups each of which is a set of a plurality of signal points included in the different layer and superimposed at an identical signal point of the first layer;

select the first decoding process as the decoding process based on presence of the overlap; and select the second decoding process as the decoding process based on absence of the overlap.

8. The signal processing device according to claim 1, wherein the reception signal is a signal generated by an LDM (Layered Division Multiplexing) method.

9. The signal processing device according to claim 8, wherein the signal of the first layer and the signal of the different layer are signals of stream data for broadcasting.

10. The signal processing device according to claim 1, wherein the signal processing device is a first processor, and the post-stage processing unit is a second processor that processes data output from the first processor.

11. A reception device, comprising:

a reception processing unit that outputs, to a post-stage processing unit, data obtained by decoding a reception signal that includes a signal included in a first layer and a signal included in a different layer and superimposed on the signal of the first layer in a power axis direction, wherein the reception processing unit includes circuitry configured to:

acquire identification information associated with the data output to the post-stage processing unit, execute a first decoding process that decodes the signal of the different layer based on a result of decoding of the signal of the first layer after the decoding of the signal of the first layer, and a second decoding process that directly decodes the signal of the different layer without decoding the signal of the first layer, select, based on information associated with the reception signal, either the first decoding process or the second decoding process as a decoding process, based on a determination that the data identified by the identification information is the data obtained by decoding the signal of the different layer, decode the signal of the different layer based on the selected decoding process and the result of the decoding of the signal of the first layer after the decoding of the signal of the first layer, and output data obtained by decoding the signal of the different layer to the post-stage processing unit without outputting data obtained by decoding the signal of the first layer to the post-stage processing unit, based on the determination that data identified by the identification information is data obtained by decoding the signal of the different layer.

12. A signal processing method, comprising:

acquiring identification information associated with data obtained by decoding a reception signal that includes a signal included in a first layer and a signal included in a different layer and superimposed on the signal of the first layer in a power axis direction, the data being output to a post-stage processing unit;

executing a first decoding process that decodes the signal of the different layer based on a result of decoding of the signal of the first layer after the decoding of the signal of the first layer, and a second decoding process that directly decodes the signal of the different layer without decoding the signal of the first layer;

selecting, based on information associated with the reception signal, either the first decoding process or the second decoding process as a decoding process, based on a determination that the data identified by the identification information is the data obtained by decoding the signal of the different layer;

decoding the signal of the different layer based on the selected decoding process and the result of the decoding of the signal of the first layer after the decoding of the signal of the first layer; and outputting data obtained by decoding the signal of the different layer to the post-stage processing unit without outputting data obtained by decoding the signal of the first layer to the post-stage processing unit, based on the determination that data identified by the identification information is data obtained by decoding the signal of the different layer.

13. A non-transitory computer-readable medium having stored thereon computer-executable instructions that, when executed by a processor, cause the processor to execute operations, the operations comprising:

acquiring identification information associated with data obtained by decoding a reception signal that includes a signal included in a first layer and a signal included in a different layer and superimposed on the signal of the first layer in a power axis direction, the data being output to a post-stage processing unit;

executing a first decoding process that decodes the signal of the different layer based on a result of decoding of the signal of the first layer after the decoding of the signal of the first layer, and a second decoding process that directly decodes the signal of the different layer without decoding the signal of the first layer;

selecting, based on information associated with the reception signal, either the first decoding process or the second decoding process as a decoding process, based on a determination that the data identified by the identification information is the data obtained by decoding the signal of the different layer;

decoding the signal of the different layer based on the selected decoding process and the result of the decoding of the signal of the first layer after the decoding of the signal of the first layer; and outputting data obtained by decoding the signal of the different layer to the post-stage processing unit without outputting data obtained by decoding the signal of the first layer to the post-stage processing unit, based on the determination that data identified by the identification information is data obtained by decoding the signal of the different layer.

* * * * *